US012780148B2

(12) United States Patent
Kim et al.

(10) Patent No.: US 12,780,148 B2
(45) Date of Patent: Nov. 3, 2026

(54) AUTHENTICATION DEVICE AND VEHICLE HAVING THE SAME

(71) Applicants: HYUNDAI MOTOR COMPANY, Seoul (KR); KIA CORPORATION, Seoul (KR)

(72) Inventors: Hyunsang Kim, Seoul (KR); Yunsup Ann, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 151 days.

(21) Appl. No.: 18/370,514

(22) Filed: Sep. 20, 2023

(65) Prior Publication Data

US 2024/0149832 A1 May 9, 2024

(30) Foreign Application Priority Data

Nov. 4, 2022 (KR) ........................ 10-2022-0146108

(51) Int. Cl.
*B60R 25/25* (2013.01)
*B60R 25/30* (2013.01)

(52) U.S. Cl.
CPC .......... *B60R 25/252* (2013.01); *B60R 25/305* (2013.01)

(58) Field of Classification Search
CPC ..... B60R 25/252; B60R 25/305; B60R 25/25; B60R 2325/205; G07C 9/00563
See application file for complete search history.

(56) References Cited

U.S. PATENT DOCUMENTS

| | | | | |
|---|---|---|---|---|
| 9,230,152 B2 * | 1/2016 | Boshra | G06V 40/1365 | |
| 11,960,532 B2 * | 4/2024 | Zhang | G06V 40/16 | |
| 2002/0154793 A1 * | 10/2002 | Hillhouse | G06F 18/28 | 382/115 |
| 2006/0294393 A1 * | 12/2006 | Mc Call | H04L 9/3231 | 713/186 |
| 2010/0232658 A1 * | 9/2010 | Omoto | B60R 25/255 | 707/E17.014 |
| 2011/0215900 A1 * | 9/2011 | Corradino | H04M 1/72463 | 340/5.52 |
| 2012/0148117 A1 * | 6/2012 | Chang | G06V 40/50 | 382/118 |
| 2013/0259330 A1 * | 10/2013 | Russo | G06V 40/1365 | 382/115 |
| 2015/0347816 A1 * | 12/2015 | Boshra | G06V 40/1306 | 382/124 |
| 2016/0101783 A1 * | 4/2016 | Abou-Nasr | B60W 40/08 | 340/5.82 |

(Continued)

FOREIGN PATENT DOCUMENTS

JP 2004126813 A * 4/2004

*Primary Examiner* — Nay Tun
(74) *Attorney, Agent, or Firm* — Morgan, Lewis & Bockius LLP

(57) ABSTRACT

The vehicle may include a communicator configured to communicate with a mobile device; a camera; and an authentication apparatus configured to perform user authentication based on image information obtained by the camera, and provide a user with a vehicle control right, in response to the user authentication being successful. In response to receiving biometric information of the user stored in the mobile device through the communicator, the authentication apparatus may be configured to update pre-registered biometric information of the user based on the received biometric information.

17 Claims, 12 Drawing Sheets

(56) References Cited

U.S. PATENT DOCUMENTS

| | | | | |
|---|---|---|---|---|
| 2016/0171280 | A1* | 6/2016 | Han | G06V 40/197 348/77 |
| 2016/0300234 | A1* | 10/2016 | Moss-Pultz | H04L 9/3247 |
| 2018/0012092 | A1* | 1/2018 | Gleeson-May | G06V 10/95 |
| 2019/0263415 | A1* | 8/2019 | Gong | B60K 28/00 |
| 2020/0167579 | A1* | 5/2020 | Boye | G07C 9/00563 |
| 2022/0058378 | A1* | 2/2022 | Ann | G06F 3/167 |

* cited by examiner

AUTHENTICATION DEVICE AND VEHICLE HAVING THE SAME

CROSS-REFERENCE TO RELATED APPLICATION

The present application claims priority to Korean Patent Application No. 10-2022-0146108, filed on Nov. 4, 2022, the entire contents of which is incorporated herein for all purposes by this reference.

BACKGROUND OF THE PRESENT DISCLOSURE

Field of the Present Disclosure

The present disclosure relates to an authentication apparatus for user registration and authentication of a registered user and a vehicle having the same.

Description of Related Art

Vehicles may be started or stopped and be locked or unlocked with a key or a remote controller. That is, a driver is able to open or close vehicle doors and trunk, and even start the vehicle simply by carrying a remote controller.

By performing two-way communication with a vehicle, a remote controller allows vehicle doors or trunk to be automatically opened or closed or the vehicle to start without driver's manual operation, when a driver is close to the vehicle.

Conventionally, when a driver leaves a driver's vehicle with a remote controller inside, the vehicle or items inside the vehicle may be stolen.

Recently, as a technology for replacing a remote controller, technologies configured for controlling a vehicle (door opening/closing, start control, and the like) after user authentication have been being developed.

Such user authentication technologies for vehicle control are required to robustly perform user authentication, even when changes in environment and users due to makeup or emotions, passage of time, and the like occur.

Furthermore, registration of user information is required for user authentication, and easy registration for users of all ages and from all walks of life is required.

Presently, such technologies are required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an authentication apparatus and a vehicle including the same that may be configured for controlling an update of pre-registered biometric information based on a similarity between the pre-registered biometric information and biometric information stored in a mobile device.

Another aspect of the present disclosure provides an authentication apparatus and a vehicle including the same that may, when biometric information is received from a mobile device in a state where user's biometric information is unregistered, register the biometric information received from the mobile device as the user's biometric information.

Additional aspects of the present disclosure will be set forth in part in the description which follows, and in part, will be obvious from the description, or may be learned by practice of the present disclosure.

According to an aspect of the present disclosure, there is provided an authentication apparatus, including: a communicator configured to communicate with a mobile device; a memory; and a processor configured to, in response to receiving biometric information of a user stored in the mobile device through the communicator, update pre-registered biometric information of the user in the memory based on the received biometric information.

The processor of the authentication apparatus according to an aspect of the present disclosure is configured to register the received biometric information as information for user authentication, upon concluding that the pre-registered biometric information is not stored in the memory.

The processor of the authentication apparatus according to an aspect of the present disclosure is configured to: determine whether the pre-registered biometric information of the user is stored in the memory in response to receiving the biometric information of the user stored in the mobile device, compare the pre-registered biometric information in the memory and the received biometric information to obtain a similarity between the pre-registered biometric information and the received biometric information, upon concluding that the pre-registered biometric information of the user is stored in the memory, and determine whether to perform the updating based on the obtained similarity.

The processor of the authentication apparatus according to an aspect of the present disclosure is configured not to perform the updating, upon concluding that the obtained similarity is less than or equal to a first similarity.

The processor of the authentication apparatus according to an aspect of the present disclosure is configured to control to output a pop-up message for user verification, upon concluding that the obtained similarity is greater than the first similarity and less than or equal to a second similarity, and the second similarity is higher than the first similarity.

The processor of the authentication apparatus according to an aspect of the present disclosure is configured to control the updating using the received biometric information, upon concluding that the obtained similarity is greater than the second similarity and less than or equal to a third similarity, and the third similarity is higher than the second similarity.

The processor of the authentication apparatus according to an aspect of the present disclosure is configured to match and store environment information and appearance change information when performing the updating using the received biometric information.

The processor of the authentication apparatus according to an aspect of the present disclosure is configured not to perform the updating, upon concluding that the obtained similarity is greater than the third similarity.

The pre-registered biometric information of the user of the authentication apparatus according to an aspect of the present disclosure includes at least one of face recognition information or fingerprint recognition information.

The received biometric information of the user of the authentication apparatus according to an aspect of the present disclosure includes at least one of the face recognition information or the fingerprint recognition information.

The received biometric information of the user of the authentication apparatus according to an aspect of the present disclosure is biometric information obtained through login to a connected car application running on the mobile device.

According to an aspect of the present disclosure, there is provided a vehicle, including: a communicator configured to communicate with a mobile device; a camera; and an authentication apparatus configured to perform user authentication based on image information obtained by the camera, and provide a user with a vehicle control right, in response to the user authentication being successful, wherein, in response to receiving biometric information of the user stored in the mobile device through the communicator, the authentication apparatus is configured to update pre-registered biometric information of the user in a memory based on the received biometric information.

The vehicle according to another aspect of the present disclosure further includes a sensor configured to detect a fingerprint. The authentication apparatus according to another aspect of the present disclosure is configured to perform the user authentication based on the fingerprint detected by the sensor.

The authentication apparatus according to another aspect of the present disclosure is configured to: determine whether the pre-registered biometric information of the user is stored, in response to receiving the biometric information of the user from the mobile device, register the received biometric information as information for user authentication, upon concluding that the pre-registered biometric information is not stored.

The authentication apparatus according to another aspect of the present disclosure is configured to: determine whether the pre-registered biometric information of the user is stored, in response to receiving the biometric information of the user from the mobile device, upon concluding that the pre-registered biometric information is stored, compare the pre-registered biometric information and the received biometric information to obtain a similarity between the pre-registered biometric information and the received biometric information, and determine whether to perform the updating based on the obtained similarity.

The authentication apparatus according to another aspect of the present disclosure is configured not to perform the updating, upon concluding that the obtained similarity is less than or equal to a first similarity, upon concluding that the obtained similarity is greater than the first similarity and less than or equal to a second similarity, control to output a pop-up message for user verification, and control the updating using the received biometric information based on a user input, and the second similarity is higher than the first similarity.

The authentication apparatus according to another aspect of the present disclosure is configured to control the updating using the received biometric information, upon concluding that the obtained similarity is greater than the second similarity and less than or equal to a third similarity, and the third similarity is higher than the second similarity.

The authentication apparatus according to another aspect of the present disclosure is configured to match and store environment information and appearance change information when performing the updating using the received biometric information.

The authentication apparatus according to another aspect of the present disclosure is configured not to perform the updating, upon concluding that the obtained similarity is greater than the third similarity.

The pre-registered biometric information of the user of the authentication apparatus according to an aspect of the present disclosure includes at least one of face recognition information or fingerprint recognition information.

The received biometric information of the user of the authentication apparatus according to an aspect of the present disclosure includes at least one of the face recognition information or the fingerprint recognition information.

The received biometric information of the user of the authentication apparatus according to an aspect of the present disclosure is biometric information obtained through login to a connected car application running on the mobile device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
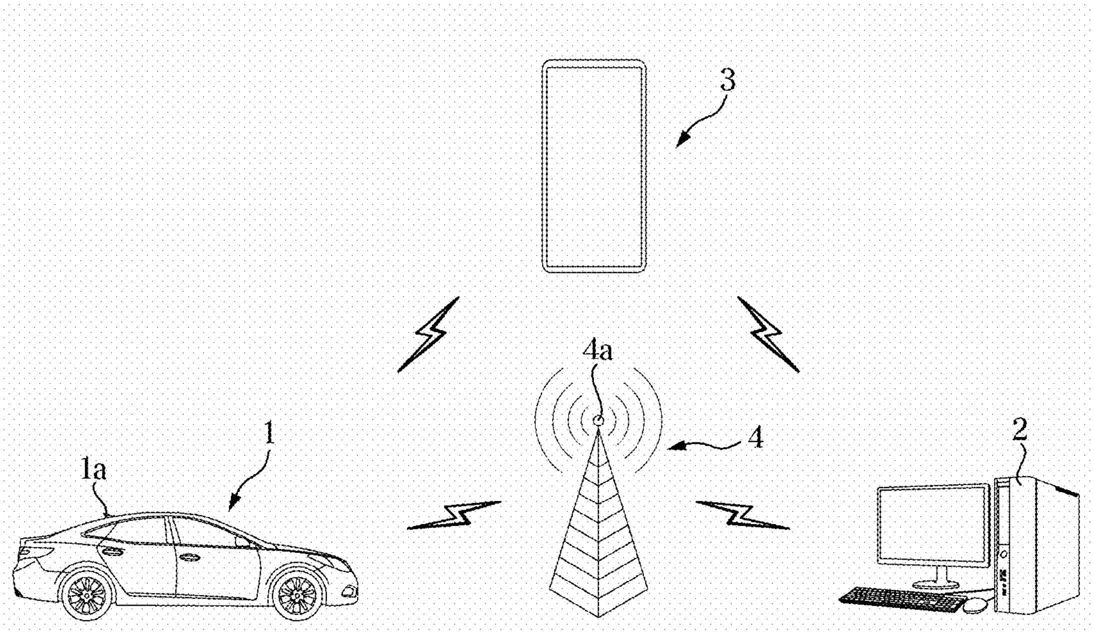
FIG. 1 is a diagram illustrating an example of communication of a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Like reference numerals throughout the specification denote like elements. Also, the present specification does not describe all the elements according to various exemplary embodiments of the present disclosure, and descriptions well-known in the art to which the present disclosure pertains or overlapped portions are omitted. The terms such as "—part", "—module", and the like may refer to at least one process processed by at least one hardware or software. According to various exemplary embodiments of the present disclosure, a plurality of "parts", "—modules" may be embodied as a single element, or a single of a "part", "—module" may include a plurality of elements.

It will be understood that when an element is referred to as being "connected" to another element, it may be directly or indirectly connected to the other element, wherein the indirect connection includes "connection" via a wireless communication network.

It will be understood that the term "include" when used in the present specification, specifies the presence of stated features, integers, steps, operations, elements, and/or components, but does not preclude the presence or addition of at least one other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a diagram illustrating an example of communication of a vehicle according to an exemplary embodiment of the present disclosure.

FIG. 1 illustrates communication among a vehicle 1, a server 2, a mobile device 3 and an infrastructure 4.

The vehicle 1 may emit electromagnetic waves to an outside via an antenna 1A.

The vehicle 1 receives an electromagnetic wave emitted from at least one of the infrastructure 4, the server 2, and the mobile device 3 via the antenna 1A, and converts the received electromagnetic wave into an electrical signal.

The vehicle 1 demodulates the electromagnetic wave received via the antenna 1A, converts into the electrical signal, generates a control signal corresponding to the converted electrical signal, and utilizes the generated control signal to control the vehicle 1.

The vehicle 1 may receive and store account information of a user form the server 2, and receive and obtain information of the mobile device 3 by linking with the mobile device 3.

The server 2 may be a server provided in a service center, a manufacturing company, a repair shop, and the like, related to the vehicle 1. The server 2 may also be a server of an application (i.e., app) providing a service associated with the vehicle 1, and a telematics server or platform server.

The mobile device 3 may provide remote service through communication with the vehicle 1.

The remote service is to provide a user with information received through the server 2 through an in-vehicle terminal 140 (refer to FIG. 3), to provide a user input received in the vehicle 1 and operation information of the vehicle 1 to the server 2 or the mobile device 3, or to control the vehicle 1 based on a user input received through the mobile device 3.

The remote service may be performed via an application provided in the mobile device 3, and an application provided in an in-vehicle terminal.

The application may be an application program for interoperating with the vehicle 1, or an application program providing a remote service for remotely controlling the vehicle 1.

A single or a plurality of mobile devices 3 may exist.

The mobile device 3 may be implemented as a computer or a portable terminal configured for accessing the vehicle 1 through a network. Here, the computer may include, for example, a laptop, a desktop, a tablet personal computer (PC), a slate PC, and the like, provided with a web browser. The portable terminal may include, for example, all kinds of handheld-based wireless communication devices that guarantee portability and mobility such as a personal communication system (PCS), a Global System for Mobile communication (GSM), a personal digital cellular (PDC), a personal handyphone system (PHS), a personal digital assistant (PDA), an international mobile telecommunication (IMT)-2000, a Code Division Multiple Access (CDMA)-2000, a wideband CDMA (WCDMA), a wireless broadband Internet (WiBro) terminal 300*a*, and a smartphone, and a wearable device 300*b* such as a watch, ring, bracelet, anklet, necklace, eyeglasses, contact lenses, or head-mounted-device (HMD), and the like.

The infrastructure 4 may receive the electromagnetic wave emitted from the antenna 1A of the vehicle 1 via an antenna 4A, and obtain information provided by the vehicle 1 or generate a control signal using the electrical signal corresponding to the received electromagnetic wave.

The infrastructure 4 may be connected to the external server 2 through a separate cable.

When an electrical signal is received from the server 2, the infrastructure 4 may convert the received electrical signal into a control signal or information, convert the converted control signal or information into an electromagnetic wave, and emit the converted electromagnetic wave through the antenna 4A. In the present instance, a vehicle located around the infrastructure 4 may receive the electromagnetic wave emitted from the infrastructure 4.

Figure 2:
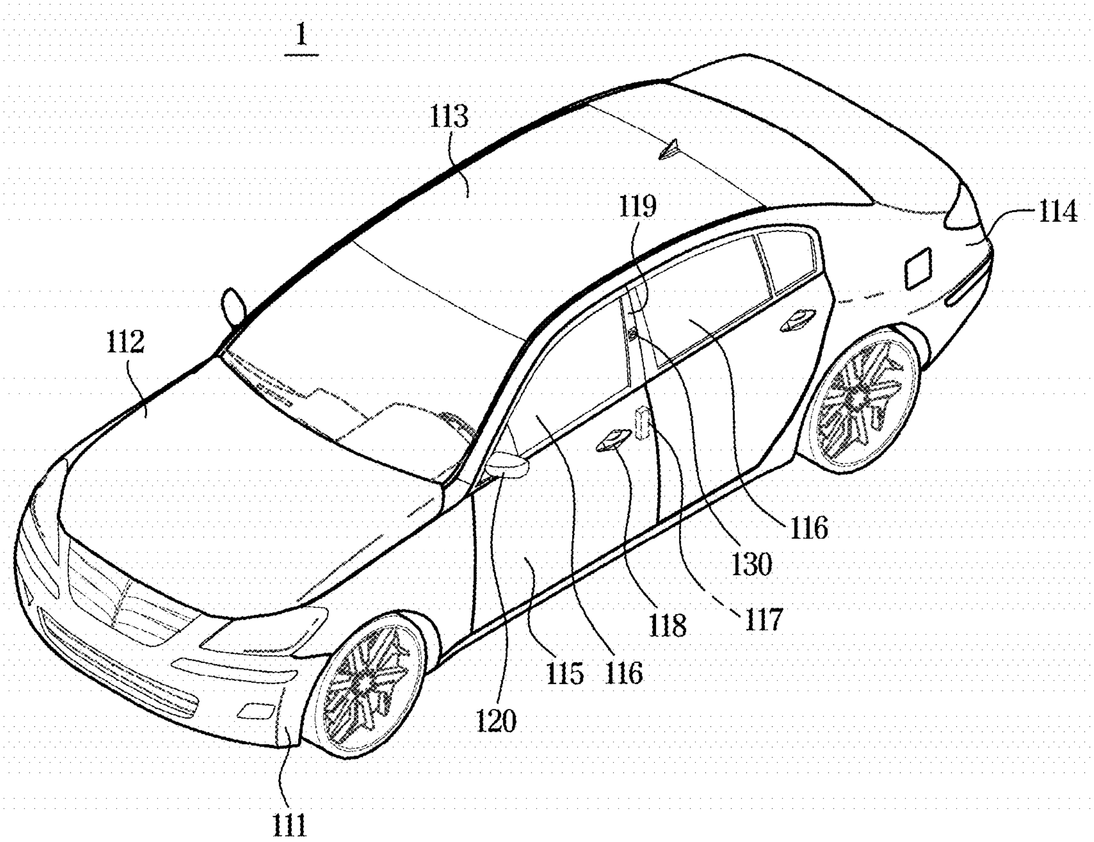
FIG. 2 is a diagram illustrating an example of an exterior of a vehicle according to an exemplary embodiment of the present disclosure.
Figure 3:
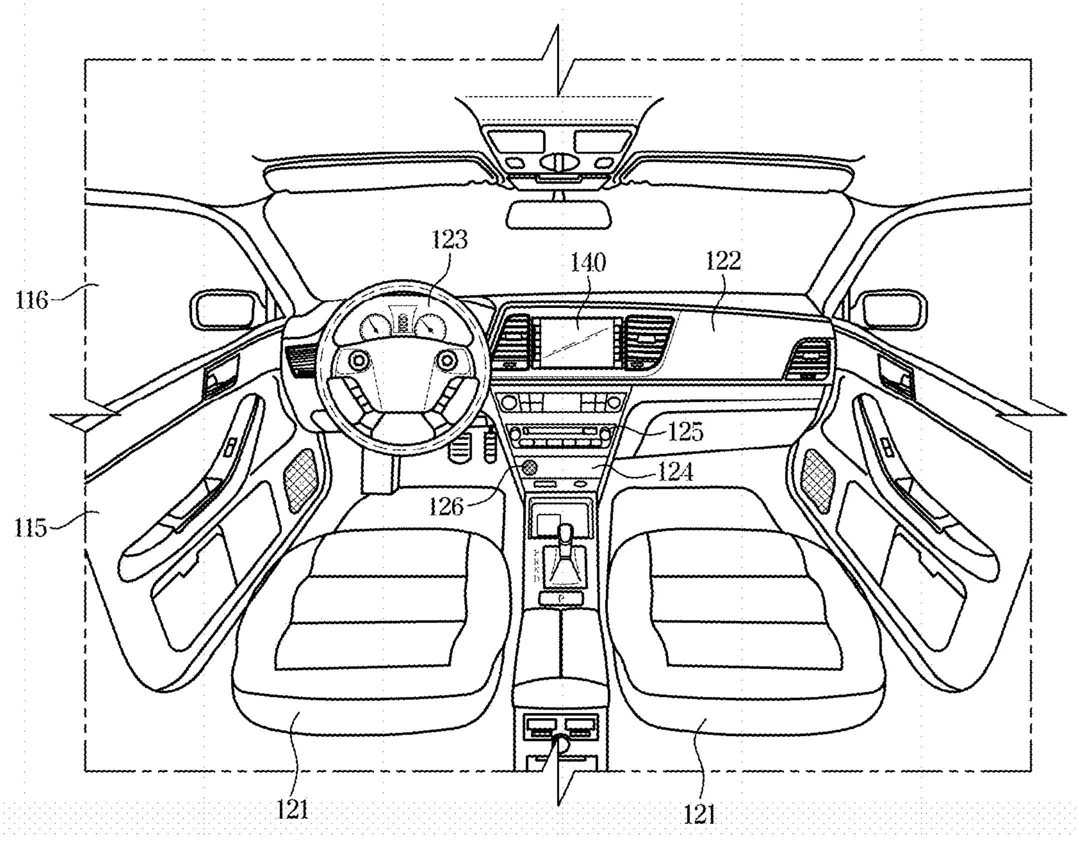
FIG. 3 is a diagram illustrating an example of an interior of a vehicle according to an exemplary embodiment of the present disclosure.

FIG. 2 is a diagram illustrating an example of an exterior of a vehicle according to an exemplary embodiment of the present disclosure. FIG. 3 is a diagram illustrating an example of an interior of a vehicle according to an exemplary embodiment of the present disclosure.

As shown in FIG. 2, the vehicle 1 includes a vehicle body having an exterior and an interior, and a chassis where mechanical devices for driving are provided as a remaining portion except for the vehicle body.

The vehicle body includes a front panel 111, a bonnet 112, a roof panel 113, a rear panel 114, a plurality of doors 115, a window glass 116 provided to each of the doors 115 to be able to be opened and closed, a front windshield glass to secure a front field of view, and a rear windshield glass to secure a rear field of view of the vehicle 1.

Each of the doors 115 may be provided with a coupling member for coupling or separating the door from the vehicle body, and a locking member 117 for locking or unlocking the door 115.

The locking member 117 and the coupling member may be implemented as a single actuator or separate actuators.

Each of the doors 115 is provided with a handle 118 where the user may hold by hand.

The handle 118 is provided with an operation member 118A (refer to FIG. 4) for receiving a user's opening/closing command. The operation member 118A may be provided in various types such as a switch type, a button type, a touch type, a lever type, and the like.

The locking member 117 and the coupling member may be operated by manipulating the handle 118.

The vehicle may include A pillars provided on the left and right sides of the front windshield glass at edge portions of the front doors, B pillars 119 provided between the front door and the rear door, and C pillars provided on the left and right sides of the rear windshield glass at edge portions of the rear doors.

The vehicle may further include side mirrors 120 providing a rear field of view of the vehicle 1.

A first camera 130 for obtaining an image for user authentication may be further provided on the vehicle body.

The first camera 130 may be provided on the B pillar 119 of the driver-side door 115. In the instant case, the user may use a user recognition function by looking at the first camera 130 on the B pillar 119.

The first camera 130 may include a charge-coupled device (CCD) or complimentary metal-oxide-semiconductor (CMOS) image sensor, and a three-dimensional (3D) space recognition sensor such as a KINECT (RGB-D sensor), time of flight (TOF) camera, stereo camera, etc.

The first camera 130 may include a camera of surround view monitor (SVM or AVM), a camera of blind spot detection (BSD), or a camera of rear detection device. The first camera 130 may be a wide angle camera.

As shown in FIG. 3, the interior of the vehicle 1 may include seats 121 for an occupant to sit on, a dashboard 122, a cluster 123, a center fascia 124 and a head unit 125.

The vehicle 1 may further include a start button 126. When it is determined that a vehicle control right belongs to a user through user authentication, the vehicle 1 may activate the start button 126, and when the start button 126 is turned on by the user, control to start the vehicle 1.

When the start button 126 is turned on while communicating with a remote controller 5 (refer to FIG. 6) or the mobile device 3, the vehicle 1 may be configured for controlling to start the vehicle 1, and when user authentication is performed, control turning ON/OFF of the vehicle 1.

The vehicle 1 may further include the terminal 140 (refer to FIG. 3, also referred to as an audio, video, navigation (AVN) terminal or a vehicle terminal).

The terminal 140 may be embedded in the dashboard 122 or provided on the dashboard 122 to be vertically stood.

The terminal 140 outputs information related to various functions performed in the vehicle 1 and information related to various functions for user convenience.

For example, the terminal 140 may output navigation information in response to a navigation mode, audio information in response to an audio mode, and video information in response to a vide mode.

The terminal 140 may receive and output information of the mobile device 3 by linking with the mobile device 3.

For example, the terminal 140 may display device user's schedule information stored in the mobile device 3, output audio information stored in the mobile device 3 and receive destination information stored in the mobile device 3.

The terminal 140 may perform remote service for user convenience.

The terminal 140 may include an application for linking with the mobile device 3 and an application for performing remote service.

When the navigation mode is selected while performing remote service, the terminal 140 may transmit current location information and destination information to the server 2, and output navigation information based on route information received from the server 2. The route information received from the server 2 may change based on traffic information while driving.

When the vehicle 1 is an autonomous vehicle, the vehicle 1 may be configured for controlling autonomous driving based on navigation information of the terminal 140.

When performing remote service, the terminal 140 may output at least one of news information or weather information received from the server 2.

When performing remote service, the terminal 140 may receive destination information or information related to a user's schedule from the mobile device 3.

The terminal 140 may include a first display device 142, and may further include a first input device 141.

The terminal 140 may include a display device panel as the first display device 142, and further include a touch panel as the first input device 141. That is, the terminal 140 may include only the display device panel, or include a touch screen into which the touch panel and the display device panel are integrated. When implemented as the touch screen, the terminal 140 may directly receive an operating command of the user through the touch panel.

When implemented as the display panel only, the terminal 140 may receive a selection on buttons displayed on the display panel, using an input device provided on the head unit or center fascia.

The chassis of the vehicle 1 is a frame for supporting the vehicle body, and may include a plurality of wheels of the vehicle, a power device configured for applying a driving force to the wheels of the vehicle, a steering device, a brake device configured for applying a braking force to the wheels of the vehicle and a suspension device configured for adjusting a suspension of the vehicle.

Figure 4:
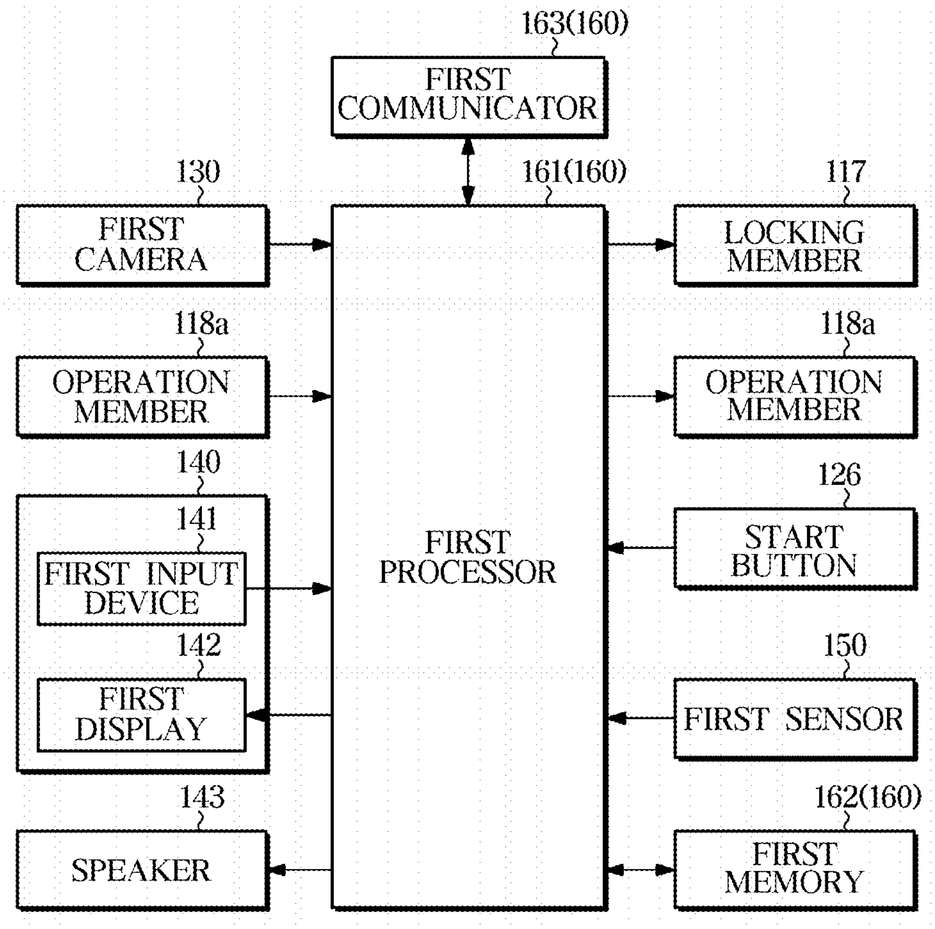
FIG. 4 is a control block diagram illustrating a configuration of a vehicle according to an exemplary embodiment of the present disclosure.

FIG. 4 is a control block diagram illustrating a configuration of a vehicle according to an exemplary embodiment of the present disclosure, which is described with reference to FIG. 5 and FIG. 6.

Figure 5:
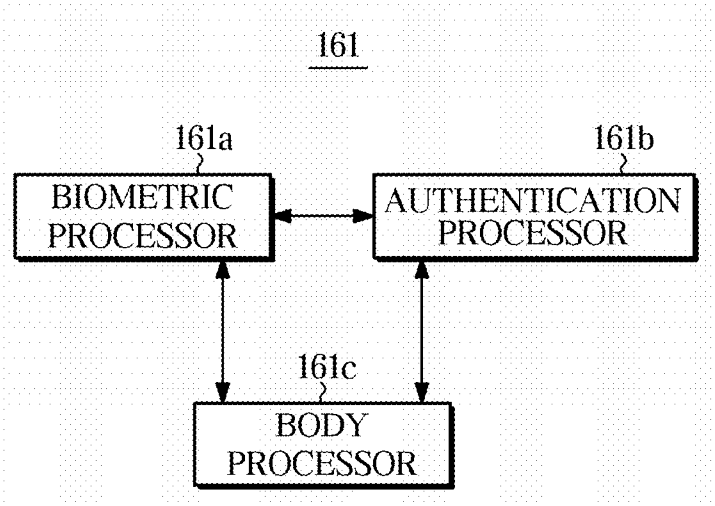
FIG. 5 is a block diagram illustrating a detailed configuration of processors of an authentication apparatus provided in a vehicle according to an exemplary embodiment of the present disclosure.

FIG. 5 is a block diagram illustrating a detailed configuration of processors of an authentication apparatus provided in a vehicle according to an exemplary embodiment of the present disclosure. FIG. 6 is a block diagram illustrating a detailed configuration of processors and communication modules of an authentication apparatus provided in a vehicle according to an exemplary embodiment of the present disclosure.

The vehicle 1 includes the locking member 117, the operation member 118A, the start button 126, the first camera 130, the terminal 140, a speaker 143, a first sensor 150, a first processor 161, a first memory 162 and a first communicator 163. Here, the first processor 161, the first memory 162 and the first communicator 163 may be constituent components of an authentication apparatus 160, or be constituent components of a vehicle.

The locking member 117 may be provided in each of the doors 115, and keep each of the doors 115 in an unlocked state so that each of the doors 115 may be opened or closed, or keep each of the doors 115 in a locked state so that each of the doors 115 may not be opened or closed. The locking member 117 may include a latch.

The locking member 117 may allow each of the doors 115 to be locked to the vehicle body or to be unlocked to the vehicle body, in response to a control command of the first processor 161.

The operation member 118A may be provided in the handle 118 of each of the doors 115, transmit a lock signal to the first processor 161 in response to a door lock command of a user, and transmit a unlock signal to the first processor 161 in response to a door unlock command of the user. The operation member 118A may include one of a button, a switch, a touch pad, and lever.

The operation member 118A may be provided as a touch type and transmit a touch signal by the user to the first processor 161. For example, the operation member 118A may transmit a touch signal corresponding to a user's door unlock intention to the first processor 161, and a touch signal corresponding to a user's door lock intention to the first processor 161.

The start button 126 may receive a user input. Here, the user input may be a vehicle ON command or a vehicle OFF command.

The first camera 130 may wake up in response to user's approach, and switch to a sleep mode when the user is not detected.

The first camera 130 may wake up in response to a registration start command of biometric information of the user.

The first camera 130 may perform the sleep mode or a wake up mode in response to a control command of the authentication apparatus 160.

The first camera 130 is a device configured for obtaining an image, and may include a complementary metal oxide semiconductor (CMOS) image sensor, a charge coupled device (CCD) image sensor, or an infrared camera.

The first camera 130 may be provided around a driver-seat door to face an outside of the vehicle to obtain an image outside the vehicle.

The first camera 130 may be rotatably provided to change a field of view of the first camera 130. The first camera 130 may rotate in a direction of a location where the user is recognized.

The first camera 130 may detect object information around the vehicle, convert into an electrical image signal, and transmit the image signal to the first processor 161.

The terminal 140 outputs information related to various functions performed in the vehicle 1 and information related to various functions for user convenience.

The terminal 140 may be referred to as a connected car integrated cockpit (ccIC) or an audio video navigation (AVN) device.

When performing remote service, the terminal 140 may transmit information received from the mobile device 3 to the first processor 161.

The first input device 141 of the terminal 140 receives a user input.

The first input device 141 receives an operation command of at least one of functions performable in the terminal 140.

The functions performable in the terminal 140 may include a remote service function, a navigation function, a phone call function, a broadcast output function, an audio function, a radio function, an Internet function, a communication function with the mobile device 3, and may further include a communication function with the server 2.

The first input device 141 may receive identification information of the user.

The identification information may include at least one of a user's name, identifier (ID), or contact number.

The first input device 141 may be implemented as at least one of a physical button, key, or switch.

The first input device 141 may receive environment information such as indoor/outdoor information and weather information, and also receive illumination information.

For example, the weather information received in the first input device may include being sunny, rainy, snowy, foggy, high level of fine dust concentration, and the like, and the illumination information received in the first input device may include dawn, daytime, early evening, and night.

The first input device 141 may receive a registration start command, a registration end command, and a deletion command of user's biometric information.

The first input device 141 may receive an update approval command and update cancellation command of user's biometric information.

The first input device 141 may receive an authentication request command for requesting for authentication to the server 2, an authentication approval command for notifying the user of whether the authentication is successful, and account selection information for notifying that one of a plurality of accounts has been selected.

When the biometric information is face information, the first input device 141 may receive a face registration start command for registering face recognition information of the user or a face registration end command, and display guide information for face registration.

The first display device 142 displays information related to a function being performed in the vehicle 1 or the terminal 140.

For example, the first display device 142 may display information related to a phone call, information related to content output through the mobile device 3, information related to music playback, and information related to external broadcasting.

The first display device 142 may receive the indoor/outdoor information and weather information which are the environment information selectable through the first input device 141, and also display illumination information.

The first display device 142 may display information related to registration start, registration end, and deletion of biometric information of the user.

The first display device 142 may display information related to update confirmation and update cancellation of user's biometric information.

The first display device 142 may display an authentication request button image for requesting for user authentication to the server 2, an authentication confirmation button image for notifying the user of whether the authentication is successful, and a plurality of account button images.

The first display device 142 may display a linkage button image with the mobile device 3 and a linkage cancellation button with the mobile device 3.

The first display device 142 may display authentication failure information and authentication completion information of a user account, and identification information of the mobile device 3.

The first display device 142 may display guide information for registering the user's account.

The first display device 142 may display remote service information, when performing a remote service function.

The first display device 142 may display communication status information with the mobile device 3 and the server 2. That is, the first display device 142 may display information related to whether communication with the server 2 is available and whether communication with the mobile device 3 is available.

The first display device 142 may display precipitation information detected by a rain sensor and illumination information detected by an illumination sensor, as environment information.

The first display device 142 may be provided as a cathode ray tube (CRT), a digital light processing (DLP) panel, a plasma display panel (PDP), liquid crystal display (LCD) panel, electro luminescence (EL) panel, electrophoretic display (EPD) panel, electrochromic display (ECD) panel, light emitting diode (LED) panel, organic LED (OLED) panel, and the like, without being limited thereto.

The speaker 143 outputs a sound in response to a control command of the first processor 161.

The speaker 143 may output voice for guiding registration, deletion or update of the biometric information of the user.

The speaker 143 may output a voice for guiding reception of the biometric information of the user from the mobile device 3.

The speaker 143 may output a guide voice about user's account information and a guide voice for notification about linkage with the mobile device 3.

A single or a plurality of speakers 143 may be provided.

The first sensor 150 may detect bio-information of the user except for a user's face.

The bio-information may include fingerprint information. In the instant case, the first sensor 150 may be a fingerprint sensor.

The fingerprint sensor may be CCD camera or CCD scanner. The fingerprint sensor may include one of an electrostatic sensor, a thermal sensor, and an ultrasonic image sensor.

The bio-information may also include voice information, iris information or vein information.

When the bio-information is voice information, the first sensor 150 may include a microphone.

When the bio-information is iris information, the first sensor 150 may include a camera or an infrared camera.

When the bio-information is vein information, the first sensor 150 may include a blood vessel scanner or a CCD camera.

A device configured for obtaining the biometric information of the user may include one of the first camera 130 or the first sensor 150.

The device configured for obtaining the biometric information of the user may include both the first camera 130 and the first sensor 150.

The vehicle 1 may further include an illumination sensor and a rain sensor.

The illumination sensor may detect external illumination and transmit information related to the detected illumination to the first processor 161.

The rain sensor may detect whether it rains, and transmit information related to whether it rains to the first processor 161.

The rain sensor may detect precipitation, and transmit information related to the detected precipitation to the first processor 161.

The authentication apparatus 160 is configured to perform user authentication to authenticate the user of the vehicle.

The authentication apparatus 160 obtains bio-information of the user for user authentication, and obtains biometric information enabling recognition of the user from the obtained bio-information.

The authentication apparatus 160 may register and store the obtained biometric information together with identification information of the user as information for authenticating the vehicle user.

The authentication apparatus 160 recognizes a face of the user based on image information obtained through the first camera 130, and is configured to perform user authentication based on face recognition information related to the recognized face and pre-registered face recognition information.

The authentication apparatus 160 may also perform user authentication through at least one of fingerprint recognition information, voice recognition information, vein recognition information, or iris recognition information as well as the face recognition-based user authentication. In the instant case, an exterior of the vehicle may be provided with at least one of a fingerprint sensor configured for obtaining fingerprint information, a microphone for obtaining voice information, an iris sensor configured for obtaining iris information, or a vein sensor for obtaining vein information.

Furthermore, the authentication apparatus 160 may perform user authentication mainly through face recognition, and perform auxiliary user authentication through one of the fingerprint recognition, voice recognition, vein recognition, or iris recognition. In the instant case, the fingerprint sensor, the microphone, the iris sensor, or the vein sensor may be provided inside the vehicle.

When receiving the biometric information of the user from the mobile device 3, the authentication apparatus 160 may obtain a similarity between the biometric information received from the mobile device 3 and pre-registered biometric information of the user, and control an update of the pre-registered biometric information based on the obtained similarity.

The authentication apparatus 160 may change the user's pre-registered biometric information to the biometric information received from the mobile device 3 through the update.

The authentication apparatus 160 may update the user's biometric information based on the obtained similarity and user input, or hold off the update.

The authentication apparatus 160 may be configured for controlling the updating of user's biometric information based on environment information.

The authentication apparatus 160 may be configured for controlling at least one of the first display device or the speaker to output guide information to suggest an update of pre-stored biometric information, based on the similarity between the received biometric information and the pre-registered biometric information.

When the user authentication is successful, the authentication apparatus 160 may transmit to at least one electronic device provided in the vehicle. The at least one electronic device may be an electronic control unit (ECU).

When the user authentication is successful, the authentication apparatus 160 may also transmit a lock command for controlling to lock the doors 115 and a unlock command for controlling to unlock the doors 115, to the locking member 117.

When the user authentication is successful, the authentication apparatus 160 may also transmit an opening command for controlling to open the window glass 116 and a closing command for controlling to close the window glass 116, to the opening/closing member.

The authentication apparatus 160 may wake up in response to a touch signal of the operation member 118A.

The authentication apparatus 160 may transmit a wake-up command to the first camera 130 in response to a touch signal of the operation member 118A.

The authentication apparatus 160 includes the first processor 161, the first memory 162 and the first communicator 163.

The first processor 161 may wake up in response to a touch signal of the operation member 181A, transmit a wake-up command to the first camera 130, recognize a face based on image information obtained from the first camera 130, and perform user authentication on the recognized face.

The first processor 161 obtains biometric information of the user which is feature information of the user, based on the image information obtained from the first camera 130. The biometric information obtained by the first camera 130 may be face recognition information.

The first processor 161 obtains the biometric information of the user which is feature information of the user, based on bio-information detected by the first sensor 150. Here, the biometric information may be one of fingerprint recognition information, voice recognition information, vein recognition information, or iris recognition information.

The first processor 161 may perform user authentication by comparing the obtained biometric information and the pre-registered biometric information stored in the first memory 162.

In response to a result of the user authentication, the first processor 161 may transmit a lock command for controlling to lock the doors 115 of the vehicle and a unlock command for controlling to unlock the doors 115 to the locking member 117.

When a registration command of biometric information is received through the first input device 141, the first processor 161 may activate the first camera 130, obtain user's face information based on image information obtained through the first camera 130, and obtain face recognition information, which is feature information of the user, from the obtained face information.

When a registration command of biometric information is received through the first input device 141, the first processor 161 may activate the first sensor 150, obtain user's bio-information information based on bio-information obtained through the first sensor 150, and obtain biometric information, which is feature information of the user, from the obtained bio-information.

The first processor 161 may be configured for controlling to output guide information related to a registration process of biometric information. When controlling to output the guide information, the first processor 161 may be configured for controlling an operation of the first display device 142 and an operations of the speaker 143.

When biometric information is received from the mobile device 3 in a state where user's biometric information is unregistered, the first processor 161 may register the received biometric information as user's biometric information for user authentication.

When registering the user's biometric information, the first processor 161 may register and store the biometric information together with identification information of the user.

When biometric information is received from the mobile device 3 in a state where user's biometric information is registered, the first processor 161 may change pre-registered biometric information of the user to the received biometric information.

When biometric information is received from the mobile device 3 in a state where user's biometric information is registered, the first processor 161 may compare the received biometric information and the pre-registered biometric information to obtain a similarity between the received biometric information and the pre-registered biometric information, and control an update of biometric information based on the obtained similarity.

When a registration end command of biometric information is received through the first input device 141, the first processor 161 may be configured for controlling at least one of the first display device 142 or the speaker 143 to output guide information related to registration end of biometric information.

When a deletion command of biometric information is received through the first input device 141, the first processor 161 may be configured to control to display registered identification information of the user, confirm user's identification information received by the first input device 141, confirm the biometric information corresponding to the confirmed identification information, and control to delete the confirmed biometric information and identification information.

The first processor 161 is configured to perform an overall control of operations of the vehicle and the authentication apparatus.

The first processor 161 may be implemented as a memory that stores an algorithm for controlling operations of constituent components of the vehicle and the authentication apparatus or data about a program that reproduces the algorithm, and a processor that is configured to perform the above-described operations using the data stored in the memory.

The biometrics, user authentication, and operation control of electronic devices may be performed in a single processor.

The biometrics, user authentication, and operation control of electronic devices may be performed in separate processors.

As shown in FIG. 5, the first processor 161 may include a biometric processor 161A recognizing user's biometric information, an authentication processor 161B for user authentication, and a body processor 161C controlling an operation of at least one electronic device provided in the vehicle in response to a result of the user authentication.

The biometric processor 161A, the authentication processor 161B and the body processor 161C are described in detail with reference to FIG. 6.

The first memory 162 stores identification information and biometric information of the user.

The identification information of the user may include account information of the user.

The account information of the user may include a contact number, a name, an email address, a picture of the user provided by the user when signing a vehicle contract.

The account information of the user may be identical to account information of the user registered through an application provided in the mobile device 3.

The biometric information of the user may include at least one of face recognition information, fingerprint recognition information, voice recognition information, vein recognition information, or iris recognition information.

The first memory 162 may store the user's biometric information corresponding to environment information.

When a plurality of users exist, the first memory 162 may store identification information and biometric information for each user.

The first memory 162 may delete the identification information and the biometric information in response to a control command of the first processor 161.

The first memory 162 may update registered biometric information of the user in response to a control command of the first processor 161.

The first memory 162 may store various information required for operating a face recognition processor. The first memory 162 may store pre-registered face recognition information which is a criterion for determining authenticity of the user.

The first memory 162 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

The first memory 162 and the first processor 161 may be integrated into one chip, or provided in physically separated chips.

The first communicator 163 communicates with at least one of the server 2, the infrastructure 4 or the mobile device 3.

The first communicator 163 transmits various information transmitted from at least one of the server 2, the infrastructure 4 or the mobile device 3 to the first processor 161, and transmits various information to the at least one of the server 2, the infrastructure 4 or the mobile device 3 based on a control command of the first processor 161.

The first communicator 163 may include at least one constituent component enabling communication with constituent components of the vehicle and a variety of external devices, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules such as a Controller Area Network (CAN) communication module, local area network (LAN) module, wide area network (WAN) module, value added network (VAN) module, or the like, and also include various cable communication modules such as a universal serial bus (USB), high definition multimedia interface (HDMI), digital visual interface (DVI), recommended standard 232 (RS-232), power line communication, plain old telephone service (POTS), or the like.

The wired communication module may further include a Local Interconnect Network (LIN).

The wireless communication module may include wireless communication modules that support a variety of wireless communication methods such as a Global System for Mobile communication (GSM), Code Division Multiple Access (CDMA), wideband CDMA (WCDMA), Universal Mobile Telecommunications System (UMTS), Time Division Multiple Access (TDMA), Long Term Evolution (LTE), and the like, in addition to a Wifi module and a Wibro module.

The first communicator 163 may receive weather information and time information from the server 2, and receive illumination information by location. The first communicator 163 may also transmit the received weather information, time information, and illumination information to the first processor 161.

The first communicator 163 may be divided into different modules according to an external device communicating with the vehicle.

The first communicator 163 may include a plurality of communication modules performing communication in different ways of communication.

A detailed configuration of the authentication apparatus shown in FIG. 5 is described with reference to FIG. 6. Also, described is an example where a face recognition processor A1 and a fingerprint recognition processor A2 are provided as the biometric processor 161A.

Among the communication modules of the first communicator 163, a communication module related to an operation of the authentication apparatus 160 may be provided in the authentication apparatus, or provided outside the authentication apparatus to perform communication with the authentication apparatus. In the exemplary embodiment of the present disclosure, described is an example where a plurality of communication modules are provided in the authentication apparatus.

A first communication module 163A may be a communication module for communicating with the mobile device 3.

The first communication module 163A may be a communication module provided in the biometric processor 161A or the authentication processor 161B.

The first communication module 163A may include at least one of a Bluetooth low energy (BLE) module, a ultra wide band (UWB) module or a Near Field Communication (NFC) module.

The first communication module 163A may receive information related to received signal strength together, when receiving a signal of the mobile device 3.

The first communication module 163A may include a modem (data concentrator unit (DCU)) for transmitting and receiving wireless data.

The first communication module 163A may receive vectorized biometric information from the mobile device 3, and transmit the received biometric information to the biometric processor 161A.

A second communication module 163B may be a communication module for communicating with the remote controller 5 (including a smart key). The second communication module 163B may include a plurality of antennae.

Here, the plurality of antennae may be a predetermined frequency (LF) antenna or a radio frequency (RF) antenna.

The second communication module 163B may obtain information related to received signal strength according to a signal received through at least one of the plurality of antennae.

The second communication module 163B may include a plurality of UWB modules.

The second communication module 163B may obtain location information of the remote controller based on an UWB signal received from the remote controller 5.

For example, a location of the remote controller 5 may be determined based on various positioning algorithms. A location of a smart key may be determined based on a time of difference of arrival (TDoA) of the UWB signal received from the remote controller 5, and a location of the remote controller 5 may be determined based on a two way ranging (TWR) method. Furthermore, the location of the remote controller 5 may be identified using various positioning algorithms such as an angle of arrival (AoA), angle of departure (AoD), time of arrival (ToA), time of flight (ToF), and the like. Algorithms for estimating the location of the remote controller 5 are not limited thereto.

The second communication module 163B may include a Bluetooth communication module and/or a Bluetooth low energy (BLE) communication module.

The second communication module 163B may be provided in the body processor 161C.

A third communication module 163C may include a CAN communication module performing communication among various devices provided inside the vehicle.

The third communication module 163C may perform CAN communication or Ethernet communication with the authentication processor 161B, and perform CAN communication with the body processor 161C. Here, the CAN communication may be a body CAN (B CAN) communication.

When the first camera 130 is provided in the vehicle 1, the biometric processor 161A may obtain biometric information of the user based on image information obtained by the first camera 130. In the instant case, the biometric processor 161A may be the face recognition processor A1.

When the first sensor 150 is provided in the vehicle 1, the biometric processor 161A may obtain biometric information of the user based on detecting information obtained by the first sensor 150. In the instant case, the biometric processor 161A may be the fingerprint recognition processor A2.

When the first camera 130 and the first sensor 150 are provided in the vehicle 1, the biometric processor 161A may include the face recognition processor A1 obtaining the biometric information of the user based on the image information obtained by the first camera 130, and the fingerprint recognition processor A2 obtaining fingerprint recognition information of the user based on fingerprint information obtained by the first sensor 150.

The face recognition processor A1 may be configured for controlling at least one of the first display device 142 or the speaker 143 to output guide information related to a face registration procedure in response to a registration start command of biometric information.

The face recognition processor A1 may recognize a user's face based on the image information obtained by the first camera 130 in response to registration of the user's biometric information, and register and store face recognition information related to the recognized face as information for user authentication.

After the face recognition information is registered, when an image is obtained by the first camera 130 for user authentication, the face recognition processor A1 may recognize the face based on the obtained image information and transmit the face recognition information related to the recognized face to the authentication processor 161B and the body processor 161C through the third communication module 163C.

For registration of face recognition information and authentication using the face recognition information, an image processing procedure at recognition of face recognition information of the user is described as an example.

At recognition of face recognition information of the user, the face recognition processor A1 may perform image preprocessing on a user's face image obtained by the first camera 130. The image preprocessing may include one or more processes for processing the user's face image into a form more suitable for user authentication.

For example, the image preprocessing may include a process of removing noise included in the user's face image, a process of increasing contrast of the user's face image, a deblurring process of removing blur included in the user's face image, a process of removing a background region, a warping process to correct distortion included in the user's face image, a process of binarizing the user's face image, and the like.

The face recognition processor A1 detects a face area from the user's face image. For example, the face area may be detected from the user's face image using a Haar-based cascade adaboost classifier, a neural network-based classifier or support vector machine, and the like, without being limited thereto. The face recognition processor A1 may detect the face area from the user's face image using various face detection techniques.

The face recognition processor A1 may perform normalization on the detected face area. The face recognition processor A1 may detect facial landmarks from the detected face area, and normalize the face area based on the detected facial landmarks.

For example, the face recognition processor A1 may detect the facial landmarks from the face area, using an active contour model (ACM), an active shape model (ASM), an active appearance model (AAM), a supervised descent method (SDM) or other feature point detection techniques based on a neural network, and the like. The facial landmarks are feature points for identifying major facial parts such as eyebrows, eyes, nose, lips, chin, ears, facial contours, and the like.

The normalization may include, for example, an image cropping process of extracting a face image representing a face area from a user's face image, a process of matching positions of feature points detected from the face area to predefined reference positions, a process of adjusting a size of the extracted face area, and the like.

As an exemplary embodiment of the present disclosure, the face image extracted from the user's face image may include a form of patch image. The face recognition processor A1 may match the positions of the feature points to reference positions by performing affine transformation based on the detected positions of feature points. Here, the affine transformation serves to correspond a vector space indicated by the positions of the feature points to another vector space.

Through the above-described processes, the face recognition processor A1 may recognize face recognition information related to the user's face image.

The fingerprint recognition processor A2 may be configured for controlling at least one of the first display device 142 or the speaker 143 to output guide information related to a fingerprint registration procedure in response to a registration start command of the biometric information.

The fingerprint recognition processor A2 may recognize a user's fingerprint based on fingerprint information obtained by the first sensor 150 in response to registration of the user's biometric information, and register and store fingerprint recognition information related to the recognized fingerprint as information for user authentication.

After the fingerprint recognition information is registered, the fingerprint recognition processor A2 may detect a fingerprint of a finger contacting with the first sensor 150 for user authentication, recognize fingerprint information related to the detected fingerprint, and transmit the recognized fingerprint information to the first processor 161.

Described is an example of recognizing fingerprint recognition information of the user, for registration of fingerprint recognition information and authentication using the fingerprint recognition information.

The fingerprint recognition processor A2 may recognize a fingerprint by detecting a difference in capacitance depending on a curve of fingerprint, by detecting a curve of fingerprint based on a shade of reflected light after outputting light, or by scanning fine features of epidermal layer of skin.

In addition to the above, voice recognition information, vein recognition information, and iris recognition information may be registered and stored and user authentication may be performed based on the voice recognition information, the vein recognition information, and the iris recognition information.

The biometric processor 161A may register and store the user's biometric information obtained together with the environment information and the identification information of the user, as information for user authentication.

The biometric processor 161A may transmit and receive various information to or from the authentication processor 161B and the body processor 161C through CAN communication.

The authentication processor 161B compares pre-registered biometric information and biometric information recognized by the biometric processor 161A. When it is determined that the pre-registered biometric information and the biometric information recognized by the biometric processor 161A are identical or similar, the authentication processor 161B determines that user authentication is successful. When it is determined that the pre-registered biometric information and the biometric information recognized by the biometric processor 161A are different from each other, the authentication processor 161B determines that user authentication failed.

The authentication processor 161B may transmit user authentication success information or user authentication failure information of to the body processor 161C.

The authentication processor 161B compares pre-registered face recognition information and face recognition information transmitted from the face recognition processor. That is, the authentication processor 161B compares facial landmarks of the user from among the face recognition information transmitted from the face recognition processor and reference feature points from among the pre-registered face recognition information, obtaining a similarity score between the received face recognition information and the pre-registered face recognition information.

The similarity score quantifies a similarity between the user's facial landmarks extracted from the user's face recognition information and the feature points extracted from the pre-registered face recognition information, and may be obtained based on the similarity of feature points. Here, the similarity score may be similarity.

The smaller the difference between feature values of the user's facial landmarks extracted from the user's face recognition information and feature values of the feature points extracted from the pre-registered face recognition information, the higher the similarity score. The larger the difference, the lower the similarity score may be.

The authentication processor 161B may use a variety of algorithms for determining the similarity score.

For example, the authentication processor 161B may execute an algorithm for comparing the feature values of the user's facial landmarks extracted from the user's face recognition information and the feature values of the feature points extracted from the pre-registered face recognition information.

According to various exemplary embodiments of the present disclosure, the authentication processor 161B may obtain the similarity score between the user's face recognition information and the pre-registered face recognition information using a learning model trained by machine learning.

The authentication processor 161B may compare fingerprint recognition information recognized by the fingerprint recognition processor and pre-registered fingerprint recognition information of the user, and determine whether the recognized fingerprint recognition information matches the pre-registered fingerprint recognition information. When it is determined that the recognized fingerprint recognition information is identical to the pre-registered fingerprint recognition information, the authentication processor 161B may transmit authentication success information for user authentication to the body processor 161C.

When it is not determined that the recognized fingerprint recognition information matches the pre-registered fingerprint recognition information, the authentication processor 161B may confirm the number of mismatches, and when the confirmed number of mismatches is greater than or equal to the reference number of times, control to deactivate the start button 126 and the first sensor 150.

When it is determined that a predetermined time period has passed from a point in time that the fingerprints are not matched, the authentication processor 161B may be configured for controlling to activate the first sensor 150, and when authentication success information is received by the mobile device or the remote controller, control to activate the first sensor 150.

After the user's biometric information is registered, the authentication processor 161B may obtain distance information to the mobile device 3 based on a received signal strength of a signal received through the first communication module 163A, and determine whether a distance to the mobile device 3 exceeds a reference distance based on the obtained distance information and preset reference distance information. When it is determined that the distance to the mobile device 3 exceeds the reference distance, the authentication processor 161B may transmit a sleep command to the face recognition processor A1, fingerprint recognition processor A2, the first camera 130 and the first sensor 150.

When it is determined that the distance to the mobile device 3 is less than or equal to the reference distance, the authentication processor 161B may transmit a wake-up command to the face recognition processor A1, fingerprint recognition processor A2, the first camera 130 and the first sensor 150, and also transmit a biometric command to the face recognition processor A1 and the fingerprint recognition processor A2.

The authentication processor 161B may be configured to determine whether a user that has performed biometrics is a pre-registered user based on the received biometric information and pre-registered biometric information. When it is determined that the user that has performed biometrics is a pre-registered user, the authentication processor 161B may transmit user authentication success information to the body processor 161C, and when it is not determined that the user that has performed biometrics is a pre-registered user, transmit user authentication failure information to the body processor 161C.

When receipt information of a touch signal is received from the body processor 161C, the authentication processor 161B may perform communication with the mobile device 3 through the first communication module 163A. After performing user authentication based on an electronic key received from the mobile device 3, the authentication processor 161B may be configured for controlling an unlocking operation of the locking member 117 to unlock the doors 115.

The authentication processor 161B may obtain distance information to the mobile device 3 based on a received signal strength of a signal received in the first communication module 163A after completing the control to lock the doors 115. When it is determined that a distance to the mobile device 3 exceeds a reference distance based on the obtained distance information and reference distance information, the authentication processor 161B may transmit a sleep command to the face recognition processor A1 and the first camera 130 and to the fingerprint recognition processor A2 and the first sensor 150.

In response to a registration start command of biometric information of the user, the authentication processor 161B may transmit a wake-up command to the face recognition processor A1 and the first camera 130, and receive and store face recognition information recognized by the face recognition processor A1.

In response to a registration start command of biometric information of the user, the authentication processor 161B may transmit a wake-up command to the fingerprint recognition processor A2 and the first sensor 150, and receive and store fingerprint recognition information recognized by the fingerprint recognition processor A2.

In response to a registration end command of biometric information of the user, the authentication processor 161B may transmit a sleep command to the face recognition processor A1 and the first camera 130 and to the fingerprint recognition processor A2 and the first sensor 150.

When a re-registration command of biometric information is received through the first input device 141, the authentication processor 161B may activate the face recognition processor A1 and the first camera 130 and the fingerprint recognition processor A2 and the first sensor 150, and re-register the user's biometric information based on information received through the face recognition processor A1 and the first camera 130 and the fingerprint recognition processor A2 and the first sensor 150.

When the biometric information of the user is received from the mobile device 3, the authentication processor 161B may be configured to determine whether the biometric information has been registered. When it is determined that the biometric information is unregistered, the authentication processor 161B may register the received biometric information as information for user authentication.

When it is determined the biometric information is unregistered, the authentication processor 161B may be configured for controlling the first display device to display pop-up information for guiding registration of biometric information.

The authentication processor 161B may also control the first display device to display pop-up information for inquiring whether to proceed a registration of biometric information.

The authentication processor 161B may register the biometric information received at registration of the biometric information of the user together with environment information and identification information of the user.

When it is determined the biometric information is already registered, the authentication processor 161B may be configured for controlling an update of user's pre-registered biometric information based on the received biometric information and the pre-registered biometric.

When user's biometric information is received from the mobile device 3, the authentication processor 161B may obtain a similarity between the biometric information received from the mobile device 3 and the pre-registered biometric information, and control an update of the pre-registered biometric based on the obtained similarity.

The authentication processor 161B may update the user's biometric information based on a user input and the obtained similarity, or hold off the update.

The authentication processor 161B does not perform update due to lack of reliability, when the obtained similarity is less than or equal to a first similarity.

The obtained similarity less than or equal to the first similarity refers to that a registered user is highly likely to be different from a currently recognized user. That is, a reliability of the received biometric information is significantly low.

When the obtained similarity is greater than the first similarity and is less than or equal to a second similarity, the authentication processor 161B is configured to determine that a difference between the pre-registered biometric information and the received biometric information is required to be confirmed by the user.

The authentication processor 161B may be configured for controlling the first display device to display a pop-up for inquiring whether a user recognized by the mobile device is a user of the vehicle.

When an approval command is received through the first input device, the authentication processor 161B may update the pre-registered biometric information based on the received biometric information, and when a cancellation command is received through the first input device, does not perform update.

When the obtained similarity is greater than the second similarity and is less than or equal to a third similarity, the authentication processor 161B is configured to determine that the user recognized by the mobile device 3 is identical to the user of the vehicle, but a change in user's appearance or environment occurs, and is configured to determine that the biometric information is required to be updated.

The authentication processor 161B may automatically update the pre-registered biometric information based on the received biometric information.

The authentication processor 161B may store the updated biometric information and environment information together. For example, the environment information may include information related to an indoor environment, outdoor direct sunlight environment, and outdoor non-direct sunlight environment, and may be received through the first input device.

The environment information may include precipitation information detected by a rain sensor, illumination information detected by an illumination sensor, and weather information and time information received from the server.

The authentication processor 161B may allocate an update area corresponding to each piece of the environment information, and store the biometric information in the allocated area.

The authentication processor 161B may be configured for controlling at least one of the first display device or the speaker to output guide information to suggest an update of pre-registered biometric information, based on the similarity between the received biometric information and the pre-registered biometric information.

The first similarity may be lower than the second similarity, and the second similarity may be lower than the third similarity. For example, the first similarity may be approximately 0.4, the second similarity may be approximately 0.6, and the third similarity may be approximately 0.8.

In response to receiving user authentication success information, the body processor 161C is configured to determine whether a touch signal is received from the operation member 118A, and when it is determined that the that the touch signal is received from the operation member 118A, is configured to control an unlocking operation of the locking member 117 to unlock the doors.

In response to receiving user authentication failure information, the body processor 161C is configured to control to output an alert. Afterwards, the body processor 161C is configured to determine whether a touch signal is received from the operation member 118A, and when it is determined that the that the touch signal is received from the operation member 118A, is configured to perform communication with the remote controller. After performing user authentication based on a remote key authentication signal received from the remote controller, the body processor 161C may be configured for controlling an unlocking operation of the locking member 117 to unlock the doors.

In response to receiving the touch signal of the operation member 118A, the body processor 161C transmits a biometric command to the biometric processor 161A. When user authentication success information is received from the authentication processor 161B, the body processor 161C may be configured for controlling a locking operation of the locking member 117 to lock the doors and transmit information related to the control to lock the doors to the authentication processor 161B.

In response to receiving the touch signal of the operation member 118A, the body processor 161C transmits a biometric command to the biometric processor 161A. When user authentication failure information is received from the authentication processor 161B, the body processor 161C may be configured for controlling an unlocking operation of the locking member 117 to maintain an unlocked state of the doors.

When user authentication failed, the body processor 161C attempts to communicate with at least one of the remote controller 5 or the mobile device 3, and when communication with the at least one of the remote controller 5 or the mobile device 3 is available, is configured to control to unlock the doors.

When user authentication is successful, the body processor 161C may be configured for controlling to activate the start button, and when user authentication failed, control to deactivate the start button.

The body processor 161C may transmit a wake-up command or a sleep command, and a biometric command to the biometric processor 161A, the first camera 130 and the first sensor 150, based on a received signal strength of a signal received in the second communication module 163B.

The body processor 161C may obtain distance information to the remote controller 5 based on a received signal strength of a signal received through the second communication module 163B, and determine whether a distance to the remote controller 5 exceeds a reference distance based on the obtained distance information to the remote controller 5 and predetermined reference distance information. When it is determined that the distance to the remote controller 5 exceeds the reference distance, the body processor 161C transmits a sleep command to the biometric processor 161A, and transmits a sleep command to the first camera 130 and the first sensor 150.

When it is determined that the distance to the remote controller 5 is less than or equal to the reference distance, the body processor 161C transmits a wake-up command to the biometric processor 161A, and transmits a wake-up command to the first camera 130 and the first sensor 150.

Each of the processors is configured to perform an overall control of operations of the vehicle and the authentication apparatus.

Each of the processors may be implemented as a memory that stores an algorithm for controlling operations of constituent components of the vehicle and the authentication apparatus or data about a program that reproduces the algorithm, and a processor that is configured to perform the above-described operations using the data stored in the memory.

Figure 6:
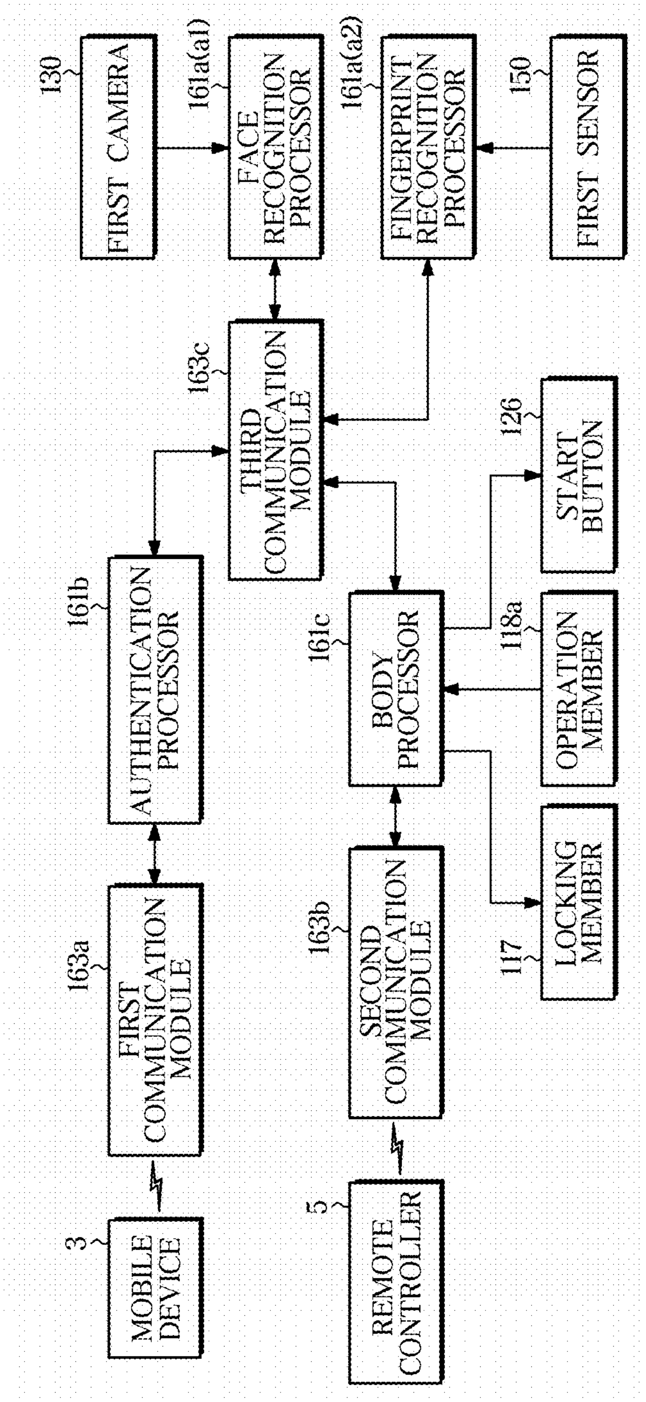
FIG. 6 is a block diagram illustrating a detailed configuration of processors and communication modules of an authentication apparatus provided in a vehicle according to an exemplary embodiment of the present disclosure.

At least one constituent component may be added or omitted corresponding to the performance of the constituent components of the vehicle illustrated in FIG. 4 and the constituent components of the authentication apparatus 160 illustrated in FIG. 5 and FIG. 6. Also, it will be easily understood by those skilled in the art that mutual positions of the constituent components may be modified corresponding to the performance or structure of the constituent components.

Meanwhile, each of the constituent components shown in FIGS. 4, 5 and 6 refers to a software, and/or a hardware component such as a field-programmable gate array (FPGA) or an application-specific integrated circuit (ASIC).

Figure 7:
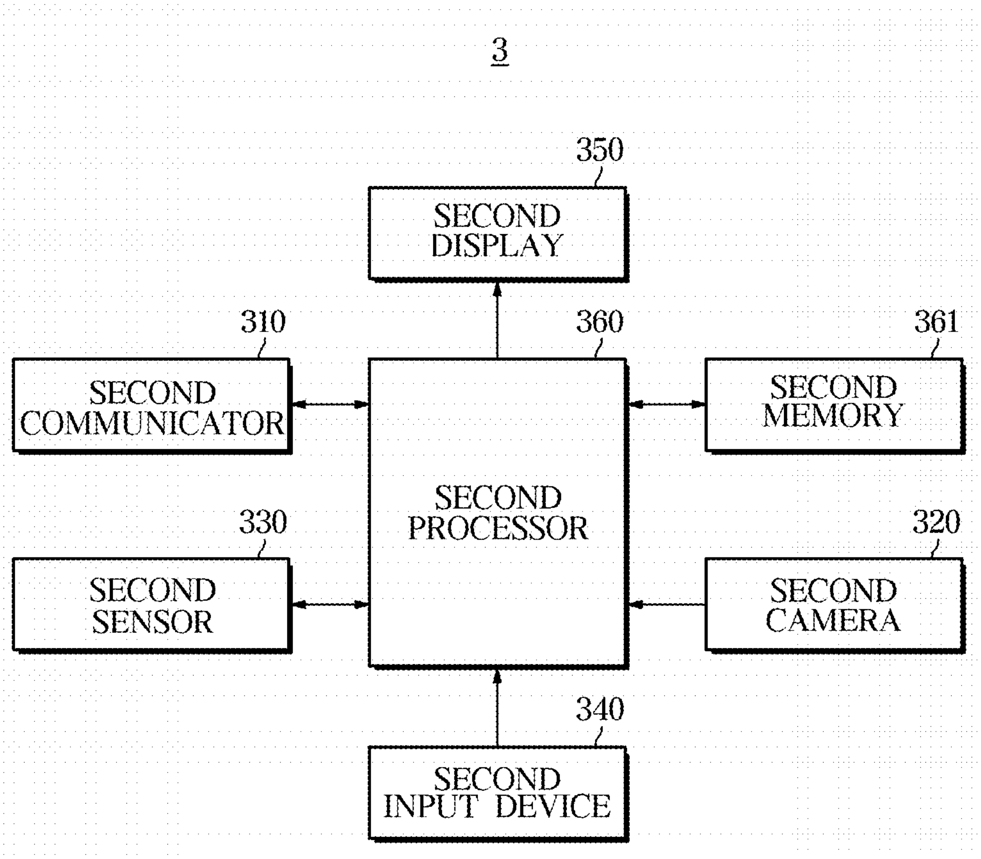
FIG. 7 is a control block diagram illustrating a mobile device communicating with a vehicle according to an exemplary embodiment of the present disclosure.

FIG. 7 is a control block diagram illustrating a mobile device communicating with a vehicle according to an exemplary embodiment of the present disclosure.

Figure 8:
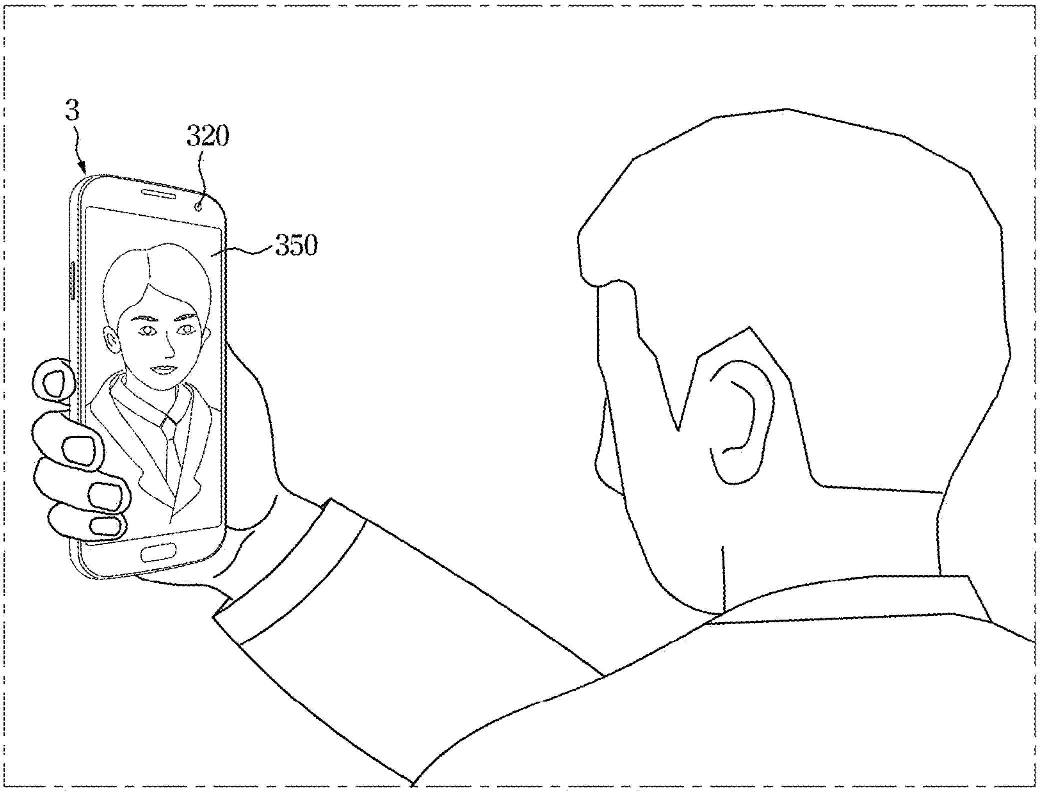
FIG. 8 is a diagram illustrating an example of obtaining a user's face image through a mobile device shown in FIG. 7.
Figure 9:
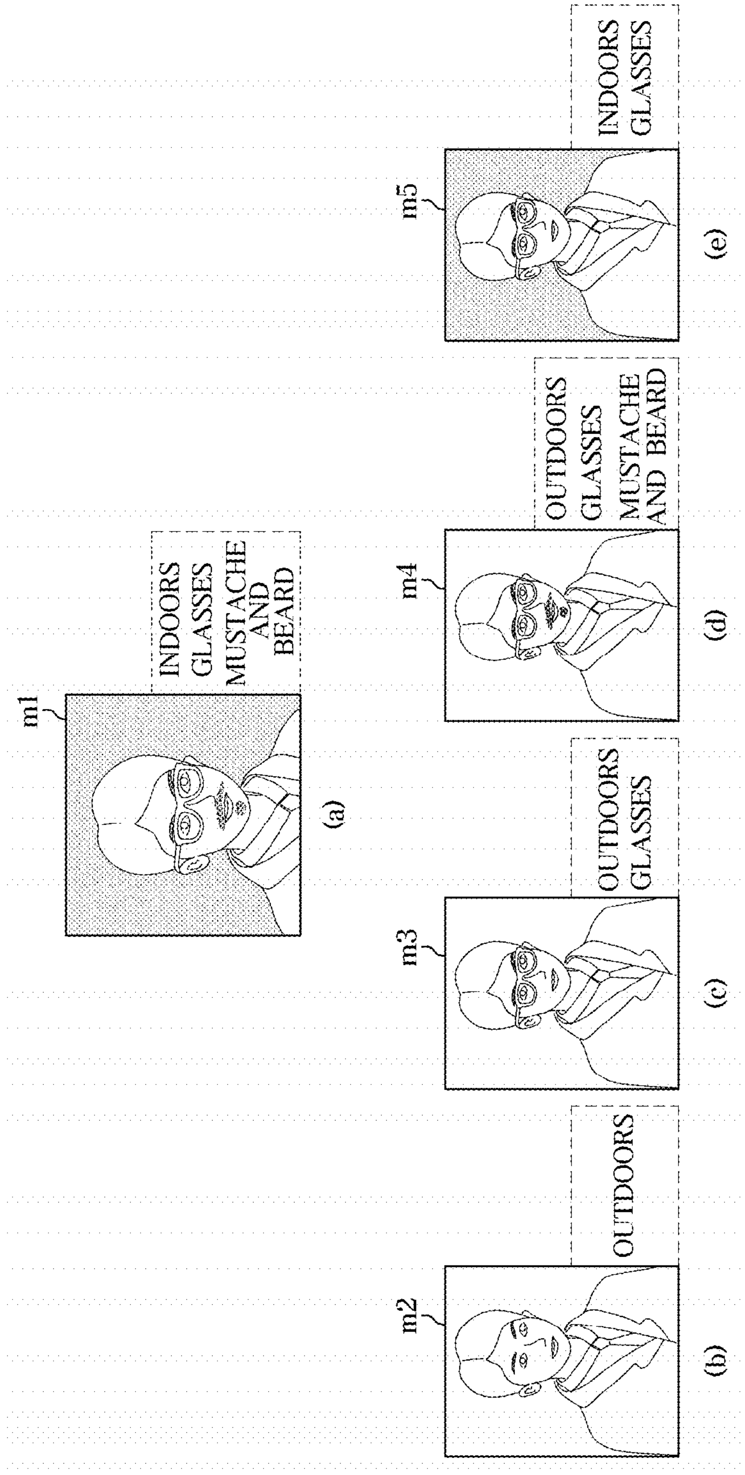
FIG. 9 is a diagram illustrating examples of user's face recognition information through a mobile device shown in FIG. 7.
Figure 10:
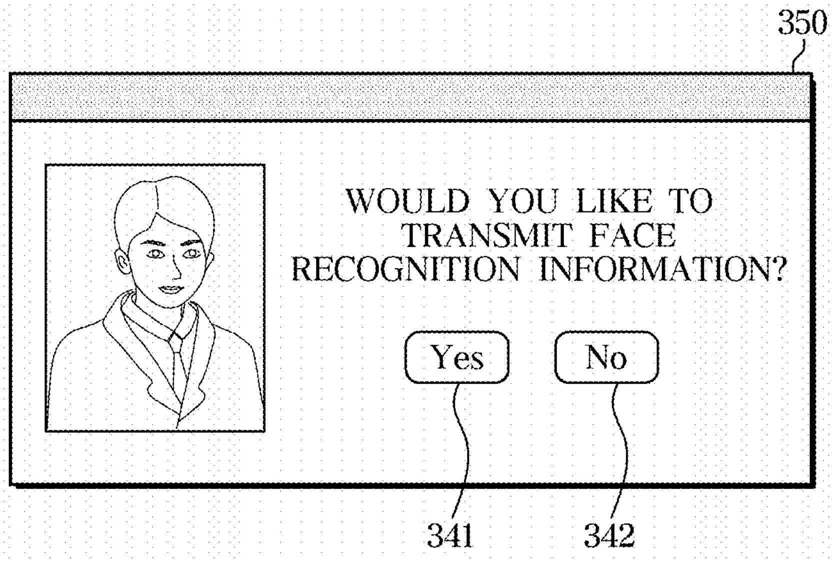
FIG. 10 is a diagram illustrating an example of a pop-up message of a mobile device shown in FIG. 7.

FIG. 8 is a diagram illustrating an example of obtaining a user's face image through a mobile device shown in FIG. 7. FIG. 9 is a diagram illustrating examples of user's face recognition information through a mobile device shown in FIG. 7. FIG. 10 is a diagram illustrating an example of a pop-up message of a mobile device shown in FIG. 7.

The mobile device 3 includes a second communicator 310, a second camera 320, a second sensor 330, a second input device 340, a second display device 350, a second processor 360, and a second memory 361.

The second communicator 310 may include at least one constituent component enabling communication with constituent components of the vehicle and the mobile device 3, for example, at least one of a short-range communication module, wireless communication module, or a wired communication module.

Because a configuration of the second communicator 310 is the same or similar to that of the first communicator, a detailed description thereof is omitted herein.

The second camera 320 may wake up in response to a registration start command of biometric information of a user.

The second camera 320 may obtain an image of the user of the mobile device, i.e., a face image.

The second camera 320 is a device configured for obtaining an image, and may include a CMOS image sensor, a CCD image sensor, or an infrared camera.

The second camera 320 may detect object information around the mobile device, convert into an electrical image signal, and transmit the image signal to the second processor 360.

The second sensor 330 may detect bio-information of the user except for a user's face.

The bio-information may include fingerprint information. In the instant case, the second sensor 330 may be a fingerprint sensor.

The fingerprint sensor may be CCD camera or CCD scanner. The fingerprint sensor may include one of an electrostatic sensor, a thermal sensor, and an ultrasonic image sensor.

The bio-information may also include voice information, iris information or vein information.

When the bio-information is voice information, the second sensor 330 may include a microphone.

When the bio-information is iris information, the second sensor 330 may include a camera or an infrared camera.

When the bio-information is vein information, the second sensor 330 may include a blood vessel scanner or a CCD camera.

A device configured for obtaining the biometric information of the user may include one of the second camera 320 or the second sensor 330.

The device configured for obtaining the biometric information of the user may include the second camera 320 and the second sensor 330.

The mobile device 3 may further include an illumination sensor.

The illumination sensor may detect external illumination and transmit information related to the detected illumination to the second processor 360.

The second input device 340 receives a user input.

The second input device 340 may receive an application execution command and an application end command.

The second input device 340 may receive identification information of the user.

The identification information may include at least one of a user's name, identifier (ID), or contact number.

The second input device 340 may be implemented as at least one of a physical button, key, or switch.

The second input device 340 may receive environment information such as indoor/outdoor information, weather information and information related to direct sunlight exists, and also receive illumination information.

For example, the weather information received in the second input device 340 may include being sunny, rainy, snowy, foggy, high level of fine dust concentration, and the like, and the illumination information received in the second input device may include dawn, daytime, early evening, and night.

The second input device 340 may receive a registration start command, a registration end command, and a deletion command of user's biometric information.

The second input device 340 may receive an update approval command and update cancellation command of user's biometric information.

The second input device 340 may receive an authentication request command for requesting for authentication to the server 2, an authentication approval command for notifying the user of whether the authentication is successful, and account selection information for notifying that one of a plurality of accounts has been selected.

When the biometric information is face recognition information, the second input device 340 may receive a face registration start command for registering face recognition information of the user or a face registration end command, and display guide information for face registration.

When the biometric information is fingerprint recognition information, the second input device 340 may receive a fingerprint registration start command for registering fingerprint recognition information of the user or a fingerprint registration end command, and display guide information for fingerprint registration.

The second display device 350 may receive the indoor/outdoor information, information related to whether direct sunlight exists and weather information which are the environment information selectable through the second input device 340, and also display illumination information.

The second display device 350 may display registration start information, registration end information and deletion information of biometric information of the user.

The second display device 350 may display update approval information and update cancellation information of biometric information of the user.

The second display device 350 may also display transmission information and transmission cancellation information of biometric information of the user.

The second display device 350 may display an authentication request button image for requesting for user authentication to the server 2, an authentication confirmation button image for notifying the user of whether the authentication is successful, and a plurality of account button images.

The second display device 350 may display authentication failure information and authentication completion information of a user account, and identification information of the mobile device 3.

The second display device 350 may display guide information for registering the user's account.

The second display device 350 may display communication status information with the vehicle 1 and the server 2.

The second display device 350 may display illumination information detected by the illumination sensor as environment information, and display time information.

The second display device 350 and the second input device 340 may be provided as a touch screen.

The second processor 360 may execute an application in response to an execution command of a connected car application, and control the second display device 350 to display an image of the application running.

For example, the connected car application may be 'Bluelink'.

The second processor 360 may be configured for controlling the second display device 350 to display an image for application membership registration, and proceed with membership registration based on input information corresponding to items required for membership registration displayed on the second display device.

The second processor 360 may request registration of biometric information for login at the application membership registration.

At the registration of biometric information for login, the second processor 360 may obtain face recognition information from a face image obtained by the second camera, and register the obtained face recognition information as authentication information for user authentication.

At the registration of biometric information for login, the second processor 360 may obtain fingerprint recognition information from detecting information obtained by the second sensor, and register the obtained fingerprint recognition information as authentication information for user authentication.

When a biometric information change command is received through the second input device, the second processor 360 may change the registered biometric information of the user to the biometric information obtained by the second camera or the second sensor.

The second processor 360 may be configured for controlling the second display device 350 to display a biometric command for login at login to an application, perform user authentication in response to the biometrics of the user, and control the second display device 350 to display user authentication success information or user authentication failure information.

The biometrics may include face recognition.

As shown in FIG. 8, a user may make face recognition to be performed by positioning a user's face in front of the second camera 320 of the mobile device 3. In the present instance, the mobile device may display a face image obtained by the second camera 320 through the second display device 350 of the mobile device.

The biometrics may further include fingerprint recognition.

The biometrics may include one of iris recognition, vein recognition or voice recognition.

The second processor 360 may recognize a user's face from the image obtained by the second camera 320, and compare face recognition information related to the recognized face and pre-registered face recognition information, determining whether user authentication is successful.

The second processor 360 may recognize a user's fingerprint from detecting information obtained through the second sensor, and compare fingerprint recognition information related to the recognized fingerprint and pre-registered fingerprint recognition information, determining whether user authentication is successful.

The second processor 360 is configured to control communication with the vehicle when user authentication is successful. In the present instance, the second processor 360 may perform bi-directional communication with the vehicle.

The second processor 360 may confirm a state of the vehicle when bi-directional communication with the vehicle is performed. The vehicle's state may include a parked state, a stopped state, and a driving state, and further include a normal state ad a failure state.

The second processor 360 may store recognized biometric information when performing biometrics for login.

When performing face recognition for login, the second processor 360 may further recognize appearance information which may change over time as well as eyes, nose, mouth, ears, and eyebrows.

The appearance information which may change over time may include a mustache and beard.

The second processor 360 may confirm environment information received through the second input device and recognize the environment information based on weather information and time information transmitted from the server.

The mobile device may include at least one sensor configured for obtaining the environment information. For example, the mobile device may further include an illumination sensor configured for detecting illumination.

The second processor 360 may recognize the environment information based on illumination information detected by the illumination sensor.

As shown in FIG. 9A, when face recognition is performed on a user with beard and mustache and glasses on indoors at login to an application, the second processor 360 stores face recognition information corresponding to a face recognition image m1, environment information (indoors) and makeup information (glasses, beard and mustache, etc.) together.

The makeup information may include information related to objects worn by the user on the face, in addition to eyes, nose, mouth, eyebrows, mustache and beard, and also include changeable appearance information.

As shown in FIG. 9B, when face recognition is performed outdoors at login to an application, the second processor 360 stores face recognition information corresponding to a face recognition image m2 and environment information (outdoors) together.

As shown in FIG. 9C, when face recognition is performed on a user with glasses on outdoors at login to an application, the second processor 360 stores face recognition information corresponding to a face recognition image m3, environment information (outdoors) and makeup information (glasses) together.

As shown in FIG. 9D, when face recognition is performed on a user with glasses on and with beard and mustache outdoors at login to an application, the second processor 360 stores face recognition information corresponding to a face recognition image m4, environment information (outdoors) and makeup information (glasses, beard and mustache) together.

As shown in FIG. 9E, when face recognition is performed on a user with glasses on indoors at login to an application, the second processor 360 stores face recognition information corresponding to a face recognition image m5, environment information (indoors) and makeup information (glasses) together.

The second processor 360 may classify categories depending on environment information and makeup information, and store each face recognition image in the divided categories.

The second processor 360 may change and store biometric information recognized at login to authentication information for user authentication. That is, the second processor 360 may update pre-registered biometric information with the biometric information recognized at login.

After user authentication is successful, the second processor 360 may confirm a matching rate between pre-registered biometric information and the biometric information recognized at login, and when the confirmed matching rate is less than a reference matching rate, update the pre-registered biometric information with the biometric information recognized at login.

The confirmed matching rate less than the reference matching rate refers to that changes in environment and user's appearance have occurred.

After user authentication is successful, the second processor 360 may confirm a matching rate between pre-registered biometric information and the biometric information recognized at login, and when the confirmed matching rate is less than a reference matching rate, transmit the biometric information recognized at login to the vehicle.

The second processor 360 may be configured to determine whether biometric information has changed each time login to a connected car application is performed, and when it is determined that the biometric information has changed, transmit the biometric information recognized at login to the vehicle.

When the face recognition image shown in FIG. 9A is a registered face recognition image and the face recognition image shown in FIG. 9B is a face recognition image recognized at login to the application, the second processor 360 may be configured to determine that user authentication is successful but changes in environment and user's appearance have occurred, and transmit the face recognition image recognized at login to the vehicle 1 as face recognition information.

That is, the second processor 360 may transmit the biometric information recognized at login after user authentication is successful, to the vehicle 1.

When transmitting the biometric information recognized at login to the vehicle, the second processor 360 may transmit environment information together.

To omit a compatibility process with information stored in the vehicle and a restoration process and prevent leakage of personal information, the second processor 360 may convert image information-based data into feature information data and transmit the converted data to the vehicle.

Here, the conversion into the feature information data includes conversion into a vector form, and through the conversion, capacity may be minimized.

The second processor 360 may transmit data to the vehicle by performing encryption in a state where the capacity is reduced by data re-extraction which is performed through feature information-based mathematical data calculation.

The second processor 360 may convert the biometric information into a data format recognizable by the vehicle, when transmitting the biometric information to the vehicle.

As shown in FIG. 10, each time login to a connected application is performed, the second processor 360 may be configured for controlling the second display device 350 to display a pop-up message for inquiring whether to transmit the biometric information to the vehicle.

When an approval button for the pop-up message is selected, the second processor 360 may transmit the biometric information recognized at login to the vehicle.

The second memory 361 stores identification information of the mobile device, and identification information and biometric information of the user.

The identification information of the user may include account information of the user.

The account information of the user may include a contact number, a name, an email address, a picture of the user provided by the user when signing a vehicle contract.

The account information of the user may be identical to account information of the user registered through an application provided in the mobile device 3.

The biometric information of the user may include at least one of face recognition information, fingerprint recognition information, voice recognition information, vein recognition information, or iris recognition information.

The second memory 361 may store user's biometric information corresponding to environment information.

The second memory 361 may store identification information of the vehicle.

The second memory 361 may delete the identification information and the biometric information of the user, and update registered biometric information of the user in response to a control command of the second processor 360.

The second memory 361 may store various information required for operating a biometric processor. The second memory 361 may store pre-registered biometric information which is a criterion for determining authenticity of the user.

The second memory 361 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a Hard Disk Drive (HDD), or a compact disc read only memory (CD-ROM), without being limited thereto.

The second memory 361 and the second processor 360 may be integrated into one chip, or provided in physically separated chips.

At least one constituent component may be added or omitted corresponding to the performance of the constituent components of the mobile device 3 illustrated in FIG. 7. Also, it will be easily understood by those skilled in the art that mutual positions of the constituent components may be modified corresponding to the performance or structure of the constituent components.

Meanwhile, each of the constituent components shown in FIG. 7 refers to a software, and/or a hardware component such as a field-programmable gate array (FPGA) or an application-specific integrated circuit (ASIC).

Figure 11:
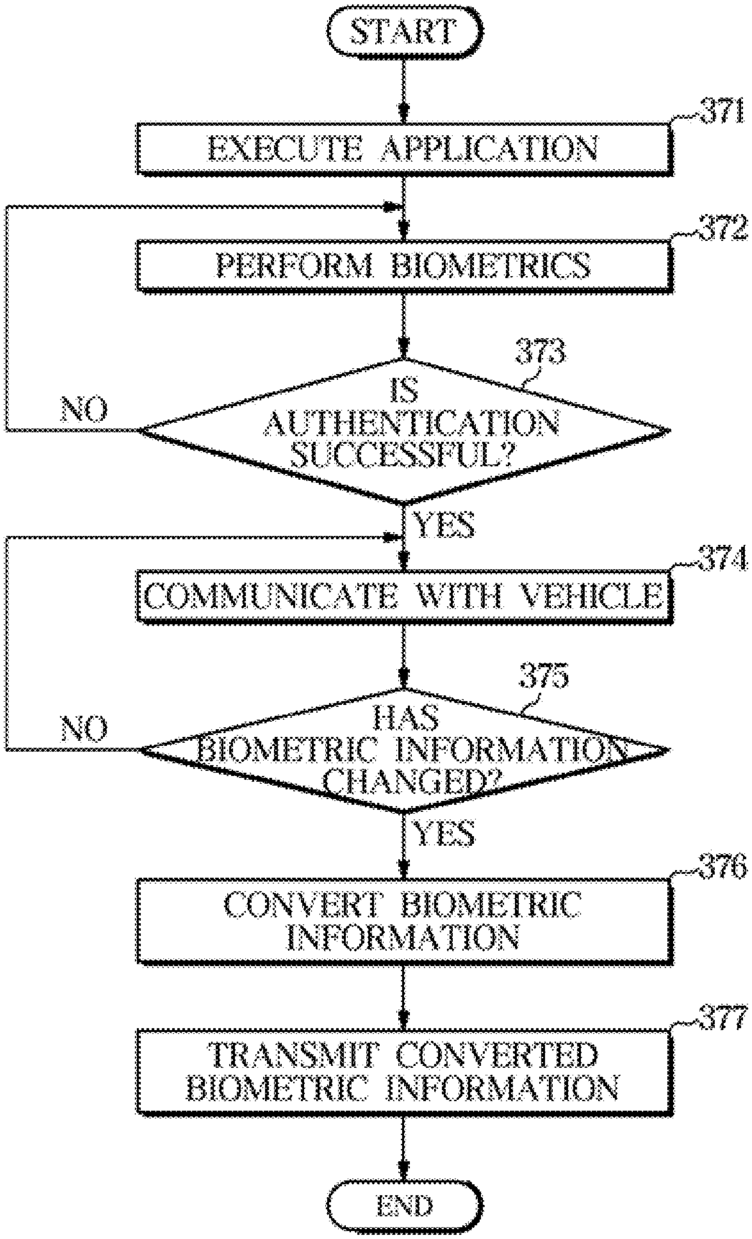
FIG. 11 is a flowchart illustrating a control method of a mobile device shown in FIG. 7.

FIG. 11 is a flowchart illustrating a control method of a mobile device communicating with a vehicle according to an exemplary embodiment of the present disclosure.

The mobile device may execute an application in response to an execution command of a connected car application. In the present instance, the mobile device may display an image of application running, on the second display device 350.

When a user is not a registered member of the application, the mobile device may display an image for application membership registration through the second display device 350.

The mobile device may proceed with membership registration based on input information corresponding to items required for membership registration displayed on the second display device.

The mobile device may request registration of biometric information for login at the application membership registration.

In the present instance, the user may select at least one of face or fingerprint of the user as information for biometrics. That is, the mobile device may receive information related to a type of biometrics selected by the user through the second input device.

When a face is selected as the type of biometrics through the second input device 340, the mobile device may output guide information for guiding face registration through at least one of the second display device or the speaker.

The mobile device may activate the second camera 320, obtain face recognition information based on a face image obtained by the second camera 320, and register the obtained face recognition information as authentication information for user authentication.

The mobile device may confirm environment information received through the second input device 340, illumination information detected by an illumination sensor, and weather information and time information received from the server, as environment information.

When registering the face recognition information of the user, the mobile device may confirm environment information when the user's face image is obtained, and store the confirmed environment information together with the face recognition information.

When a fingerprint is selected as the type of biometrics through the second input device 340, the mobile device may output guide information for guiding fingerprint registration through at least one of the second display device or the speaker.

The mobile device may activate the second sensor 350, obtain fingerprint recognition information from detecting information obtained by the second sensor 350, and register the obtained fingerprint recognition information as authentication information for user authentication.

The mobile device may execute an application (371), when an application execution command is received through the second input device 340.

The mobile device may display guide information for requesting for biometrics for login to application through the second display device 350.

The mobile device may activate at least one of the second camera or the second sensor, and obtain a user's image through the second camera or obtain detecting information through the second sensor to perform biometrics (372).

When face recognition is performed as biometrics, the mobile device obtains a user's face image based on image information obtained by the second camera 320, and obtains face recognition information of the user based on the obtained face image.

The mobile device is configured to determine whether user authentication is successful based on the obtained face recognition information and pre-registered face recognition information (373).

That is, the mobile device obtains a matching rate between the pre-registered face recognition information and the obtained face recognition information by comparing both, and when it is determined that the that the obtained matching rate is greater than or equal to a preset matching rate, is configured to determine that user authentication is successful. When it is determined that the obtained matching rate is less than the preset matching rate, the mobile device is configured to determine that user authentication failed.

The mobile device may display user authentication success information or user authentication failure information through the second display device 350.

The mobile device may confirm environment information and makeup information obtained when the face recognition information is obtained, confirm pre-registered face recognition information corresponding to the confirmed environment information and makeup information, and obtain a matching rate by comparing the confirmed face recognition information and face recognition information obtained at login.

The mobile device may perform bi-directional communication with the vehicle when user authentication is successful (374).

The mobile device is configured to determine whether biometric information has changed based on a matching rate between the pre-registered face recognition information and the face recognition information obtained at login, in a state where user authentication is successful (375).

That is, the mobile device obtains the matching rate between the pre-registered face recognition information and the face recognition information obtained at login in a state where user authentication is successful, and when it is determined that the that the obtained matching rate is less than a reference matching rate, is configured to determine that a change in user's face has occurred.

The reference matching rate may be higher than the preset matching rate.

The mobile device is configured to determine that the pre-registered face recognition information has changed and converts the face recognition information obtained at login (376).

To omit a compatibility process with information stored in the vehicle and a restoration process and prevent leakage of personal information, the mobile device converts image information-based data into feature information data.

Here, the conversion into the feature information data includes conversion into a vector form.

The mobile device re-extracts data through feature information-based mathematical data calculation and is configured to perform encryption in a state where the capacity of re-extracted data is reduced.

That is, the mobile device may convert the biometric information into a data format recognizable by the vehicle, when transmitting the biometric information to the vehicle.

The mobile device may transmit the converted face recognition information to the vehicle (377).

The mobile device may transmit, to the vehicle, environment information received through the second input device, illumination information detected by the illumination sensor, and environment information such as weather information and time information transmitted from the server.

The mobile device may further recognize makeup information from the face recognition information and transmit the recognized makeup information to the vehicle.

The makeup information may include information related to objects worn by the user on the face, in addition to eyes, nose, mouth, eyebrows, mustache and beard, and also include changeable appearance information.

That is, the mobile device may transmit, to the vehicle 1, the biometric information recognized at login after user authentication is successful.

The mobile device may be configured to determine whether biometric information has changed each time login to a connected car application is performed, and when it is determined that the that the biometric information has changed, transmit the biometric information recognized at login to the vehicle.

Figure 12:
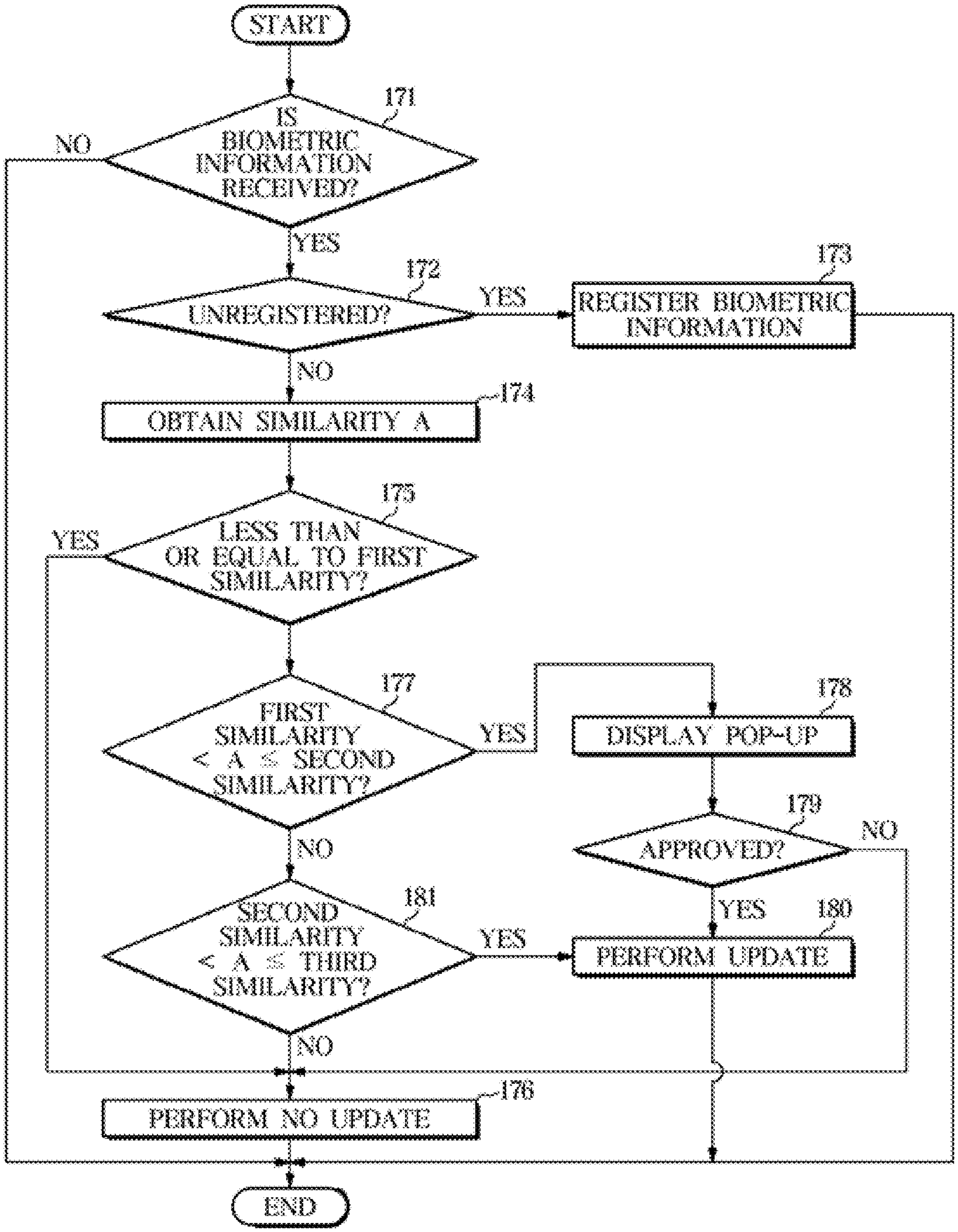
FIG. 12 is a flowchart illustrating a control method of a vehicle according to an exemplary embodiment of the present disclosure.

FIG. 12 is a flowchart illustrating a control method of a vehicle according to an exemplary embodiment of the present disclosure.

When biometric information of a user is received from the mobile device 3 (171), the vehicle is configured to determine whether the user's biometric information is unregistered in the authentication apparatus (172).

When it is determined that the user's biometric information is unregistered in the authentication apparatus, the vehicle may register the biometric information received from the mobile device 3 as authentication information for user authentication (173).

When it is determined that the user's biometric information is unregistered in the authentication apparatus, the vehicle may also display a pop-up message for inquiring whether to register the user's biometric information through the first input device 141.

When it is determined that an approval command is received through the first input device 141, the vehicle may register the user's biometric information received from the mobile device 3 as authentication information for user authentication, and when it is determined that a cancellation command is received through the first input device 141, end a registration process of the user's biometric information.

When registering the user's biometric information, the vehicle may display a pop-up message for guiding registration of biometric information through the first display device.

The vehicle may register the biometric information received when the user's biometric information is registered together with the identification information of the user and environment information.

For example, the vehicle may register face recognition information obtained in a state where the user does not grow a beard without wearing glasses, a hat, or a mask, as basic face recognition information.

The vehicle may register the basic face recognition information by differentiating an indoor environment and an outdoor environment. For example, the vehicle may register the basic face recognition information in an outdoor environment, and register the basic face recognition information in an indoor environment as authentication information for user authentication.

The vehicle may register the basic face recognition information by differentiating whether direct sunlight exists outdoors. For example, the vehicle may register the basic face recognition information in an outdoor environment where direct sunlight exists, and register the basic face recognition information in an outdoor environment without direct sunlight as authentication information for user authentication.

The vehicle may register, as authentication information for user authentication, face recognition information related to a change in appearance, by differentiating whether the user includes a beard or mustache, whether the user wears glasses, whether the user wears a mask, and whether the user wears a hat, for each environment like an indoor environment, an outdoor environment with direct sunlight, and an outdoor environment without direct sunlight.

That is, the vehicle may be configured to generate a plurality of categories based on the environment information and makeup information, and store and register each face recognition image in the plurality of categories generated.

When it is determined that the user's biometric information is already registered, the vehicle may be configured for controlling an update of pre-registered biometric information of the user, based on the user's biometric information received from the mobile device and the pre-registered biometric information of the user.

When the user's biometric information is received from the mobile device 3, the vehicle obtains a similarity A between the biometric information received from the mobile device and the pre-registered biometric information of the user (174).

The vehicle is configured to determine whether the obtained similarity A is less than or equal to a first similarity (175), and when it is determined that the that the obtained similarity A is less than or equal to the first similarity, does not perform update due to lack of reliability (176).

Here, the obtained similarity less than or equal to the first similarity refers to that a user registered in the vehicle is highly likely to be different from a currently recognized user, that is, a reliability of biometric information received from the mobile device is significantly low.

The vehicle is configured to determine whether the obtained similarity is greater than the first similarity and less than or equal to a second similarity (177).

When it is determined that the obtained similarity is greater than the first similarity and less than or equal to the second similarity, the vehicle is configured to determine that a difference between the pre-registered biometric information and the received biometric information exists.

That is, the existence of difference between the pre-registered biometric information and the received biometric information refers to that user authentication failed, but the recognized user may be the pre-registered user. Accordingly, the vehicle is configured to determine that the user is required to be verified.

In the present instance, the vehicle may display a pop-up message for inquiring whether the user recognized by the mobile device is the user of the vehicle through the first display device (178).

The vehicle is configured to determine whether an approval command is received through the first input device 141 (179), and when it is determined that the that the approval command is received through the first input device 141, updates the pre-registered biometric information based on the received biometric information (180).

The received biometric information may be biometric information converted into a data format compatible in the vehicle.

When it is determined that a cancellation command is received through the first input device 141, the vehicle does not update the pre-registered biometric information based on the received biometric information (176).

The vehicle is configured to determine whether the obtained similarity A is greater than the second similarity and less than or equal to a third similarity (181).

When it is determined that the obtained similarity A is greater than the second similarity and less than or equal to the third similarity, the vehicle updates the pre-registered biometric information based on the received biometric information (180).

The obtained similarity A greater than the second similarity and less than or equal to the third similarity refers to that the user recognized by the mobile device is identical to the user of the vehicle, but a change in user's appearance or environment has occurred.

Accordingly, when it is determined that the obtained similarity A is greater than the second similarity and less than or equal to the third similarity, the vehicle may be configured to determine that biometric information is required to be updated.

The vehicle may store the updated biometric information together with environment information. For example, the environment information may include information related to an indoor environment, an outdoor environment with direct sunlight, and an outdoor environment without direct sunlight. Also, the environment information may be received through the first input device.

The environment information may include precipitation information detected by a rain sensor, illumination information detected by the illumination sensor, and weather information and time information received from the server.

The vehicle may allocate an update area corresponding to each piece of the environment information, and store the biometric information in the allocated area.

When it is determined that the obtained similarity A is greater than the third similarity, the vehicle is configured to determine that no difference between the pre-registered biometric information and the biometric information received from the mobile device exists, and does not perform update (176).

That is, when it is determined that the obtained similarity A is greater than the third similarity, the vehicle is configured to determine that the pre-registered biometric information of the user is almost similar to the biometric information received from the mobile device and no update is required. Accordingly, update of the user's biometric information is not performed.

The first similarity may be lower than the second similarity, and the second similarity may be lower than the third similarity. For example, the first similarity may be approximately 0.4, the second similarity may be approximately 0.6, and the third similarity may be approximately 0.8.

Meanwhile, the above-described embodiments may be stored in a form of a recording medium storing computer-executable instructions. The instructions may be stored in a form of a program code, and when executed by a processor, the instructions may perform operations of the disclosed exemplary embodiments of the present disclosure. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

As is apparent from the above, according to the exemplary embodiments of the present disclosure, capacity of user's biometric information, which is obtained through a user's mobile device, may be optimized by encryption and vectorization, and be transmitted to a vehicle at an appropriate time, updating the user's biometric information with latest information. Therefore, a recognition performance of user's biometric information may be improved.

According to the exemplary embodiments of the present disclosure, when biometric information is not registered in a vehicle, biometric information transmitted from a mobile device may be registered as biometric information for user authentication, and thus the user's biometric information may be easily registered in the vehicle and user convenience for registration of biometric information may be improved.

According to the exemplary embodiments of the present disclosure, when logging in to a connected car application through a mobile device, biometric authentication information stored in the mobile device and biometric information registered in a vehicle may be compared and updated in real time, minimizing a failure rate of biometrics for user authentication.

According to the exemplary embodiments of the present disclosure, a consent to updating biometric information may be requested to a user.

According to the exemplary embodiments of the present disclosure, capacity of biometric information of a mobile device may be reduced by re-extracting data through feature information-based mathematical data calculation, and the biometric information may be encrypted and transmitted to a vehicle, preventing the biometric information from being restored to image-based data and responding to personal information protection issue.

According to the exemplary embodiments of the present disclosure, user's biometric information may be registered and stored for each environment, improving a success rate of user authentication and enhancing vehicle security.

According to the exemplary embodiments of the present disclosure, it is possible to flexibly cope with changes in user's appearance and environment when authenticating a user.

According to the exemplary embodiments of the present disclosure, only a change in software is required, preventing a cost of adding and manufacturing hardware.

According to the exemplary embodiments of the present disclosure, a quality and marketability of a vehicle may be improved and safety and competitiveness of the vehicle may be enhanced.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An authentication apparatus, comprising:

a communicator configured to communicate with a mobile device;

a memory; and a processor configured to, in response to receiving biometric information of a user stored in the mobile device through the communicator, update pre-registered biometric information of the user in the memory based on the received biometric information, wherein the processor is further configured to:

compare the pre-registered biometric information in the memory and the received biometric information to obtain a similarity value between the pre-registered biometric information and the received biometric information, and control to output a pop-up message for user verification, upon concluding that the obtained similarity value is greater than a first similarity value and less than or equal to a second similarity value, wherein the first similarity value and the second similarity value are predetermined values, and wherein the second similarity value is higher than the first similarity value, and wherein the processor is further configured to control the updating using the received biometric information, upon concluding that the obtained similarity is greater than the second similarity and less than or equal to a third similarity, and wherein the third similarity is higher than the second similarity.

2. The authentication apparatus of claim 1, wherein the processor is further configured to register the received biometric information as information for user authentication, upon concluding that the pre-registered biometric information is not stored in the memory.

3. The authentication apparatus of claim 1, wherein the processor is further configured to:

determine whether the pre-registered biometric information of the user is stored in the memory in response to receiving the biometric information of the user stored in the mobile device, upon concluding that the pre-registered biometric information of the user is stored in the memory, determine whether to perform the updating based on the obtained similarity value.

4. The authentication apparatus of claim 3, wherein the processor is configured not to perform the updating, upon concluding that the obtained similarity value is less than or equal to the first similarity value.

5. The authentication apparatus of claim 1, wherein the processor is further configured to match and store environment information and appearance change information when performing the updating using the received biometric information.

6. The authentication apparatus of claim 1, wherein the processor is configured not to perform the updating, upon concluding that the obtained similarity value is greater than the third similarity value.

7. The authentication apparatus of claim 1, wherein the pre-registered biometric information of the user includes at least one of face recognition information or fingerprint recognition information, and wherein the received biometric information of the user includes at least one of the face recognition information or the fingerprint recognition information.

8. The authentication apparatus of claim 1, wherein the received biometric information of the user is biometric information obtained through login to a connected car application running on the mobile device.

9. A vehicle, including:

a communicator configured to communicate with a mobile device;

a camera; and an authentication apparatus configured to perform user authentication based on image information obtained by the camera, and to provide a user with a vehicle control right, in response to the user authentication being successful, wherein, in response to receiving biometric information of the user stored in the mobile device through the communicator, the authentication apparatus is further configured to update pre-registered biometric information of the user in a memory based on the received biometric information, wherein the authentication apparatus is further configured to:

compare the pre-registered biometric information in the memory and the received biometric information to obtain a similarity value between the pre-registered biometric information and the received biometric information, and control to output a pop-up message for user verification, upon concluding that the obtained similarity value is greater than a first similarity value and less than or equal to a second similarity value, wherein the first similarity value and the second similarity value are predetermined values, wherein the second similarity value is higher than the first similarity value, wherein the authentication apparatus is further configured to control the updating using the received biometric information, upon concluding that the obtained similarity is greater than the second similarity and less than or equal to a third similarity, and wherein the third similarity is higher than the second similarity.

10. The vehicle of claim 9, further including:

a sensor configured to detect a fingerprint, wherein the authentication apparatus is further configured to perform the user authentication based on the fingerprint detected by the sensor.

11. The vehicle of claim 9, wherein the authentication apparatus is further configured to:

determine whether the pre-registered biometric information of the user is stored, in response to receiving the biometric information of the user from the mobile device, register the received biometric information as information for the user authentication, upon concluding that the pre-registered biometric information is not stored.

12. The vehicle of claim 9, wherein the authentication apparatus is further configured to:

determine whether the pre-registered biometric information of the user is stored, in response to receiving the biometric information of the user from the mobile device, upon concluding that the pre-registered biometric information is stored, determine whether to perform the updating based on the obtained similarity value.

13. The vehicle of claim 12, wherein the authentication apparatus is further configured not to perform the updating, upon concluding that the obtained similarity value is less than or equal to the first similarity.

14. The vehicle of claim 9, wherein the authentication apparatus is further configured to match and store environment information and appearance change information when performing the updating using the received biometric information.

15. The vehicle of claim 9, wherein the authentication apparatus is further configured not to perform the updating, upon concluding that the obtained similarity value is greater than the third similarity value.

16. The vehicle of claim 9, wherein the pre-registered biometric information of the user includes at least one of face recognition information or fingerprint recognition information, and wherein the received biometric information of the user includes at least one of the face recognition information or the fingerprint recognition information.

17. The vehicle of claim 9, wherein the received biometric information of the user is biometric information obtained through login to a connected car application running on the mobile device.

* * * * *